United States Patent [19]

Shimizu

[11] Patent Number: 6,038,647
[45] Date of Patent: *Mar. 14, 2000

[54] CACHE MEMORY DEVICE AND METHOD FOR PROVIDING CONCURRENT INDEPENDENT MULTIPLE ACCESSES TO DIFFERENT SUBSETS WITHIN THE DEVICE

[75] Inventor: Masayuki Shimizu, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/662,010

[22] Filed: Jun. 12, 1996

[30] Foreign Application Priority Data

Dec. 6, 1995 [JP] Japan .................................. 7-318414

[51] Int. Cl.[7] ................................................ G06F 12/08
[52] U.S. Cl. ........................................ 711/168; 711/129
[58] Field of Search ................................. 711/128, 129, 711/130, 131, 120, 168, 150, 153

[56] References Cited

U.S. PATENT DOCUMENTS

| 4,905,141 | 2/1990 | Brenza | 711/129 |
| 5,091,851 | 2/1992 | Shelton et al. | 711/128 |
| 5,274,790 | 12/1993 | Suzuki | 711/133 |
| 5,483,645 | 1/1996 | Tran | 711/3 |
| 5,561,781 | 10/1996 | Braceras et al. | 711/131 |
| 5,581,729 | 12/1996 | Nishtala et al. | 711/143 |
| 5,640,534 | 6/1997 | Liu et al. | 711/146 |
| 5,737,750 | 4/1998 | Kumar et al. | 711/129 |

FOREIGN PATENT DOCUMENTS

| 64-23354 | 1/1989 | Japan . |
| 1-280860 | 11/1989 | Japan . |
| 4-117540 | 4/1992 | Japan . |
| 4-199242 | 7/1992 | Japan . |

*Primary Examiner*—Eddie P. Chan
*Assistant Examiner*—Gary J. Portka
*Attorney, Agent, or Firm*—Staas & Halsey LLP

[57] ABSTRACT

A multi-access method which is applied to a cache memory device interposed between a processor and a storage device, for enabling multi-access. When two or more access requests are received, a plurality of pairs (each pair composed of a data array and a tag array) are divided into two or more non-overlapping subsets, and each of the subsets is supplied with information which specifies data to be accessed and is input in conjunction with each access request, whereby accesses are performed in parallel in accordance with the access requests. This multi-access method is applicable to a cache memory used in a high-performance parallel-processing architecture including a few processors having a common cluster.

69 Claims, 22 Drawing Sheets

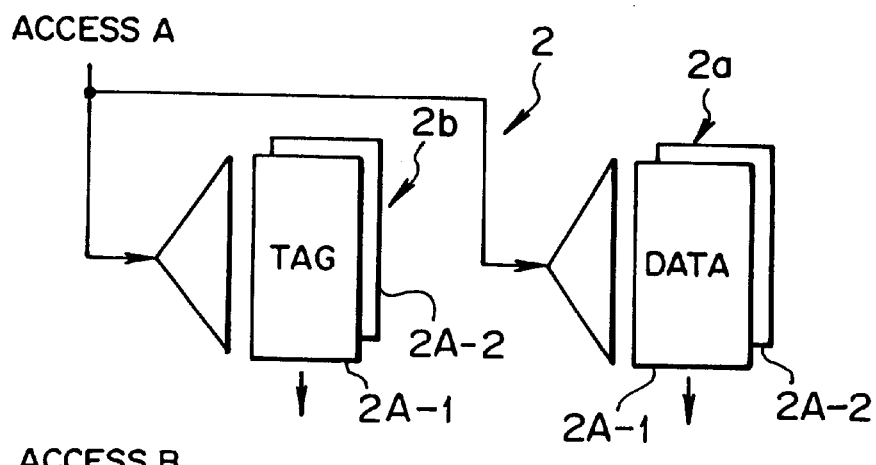
FIG.2(a)
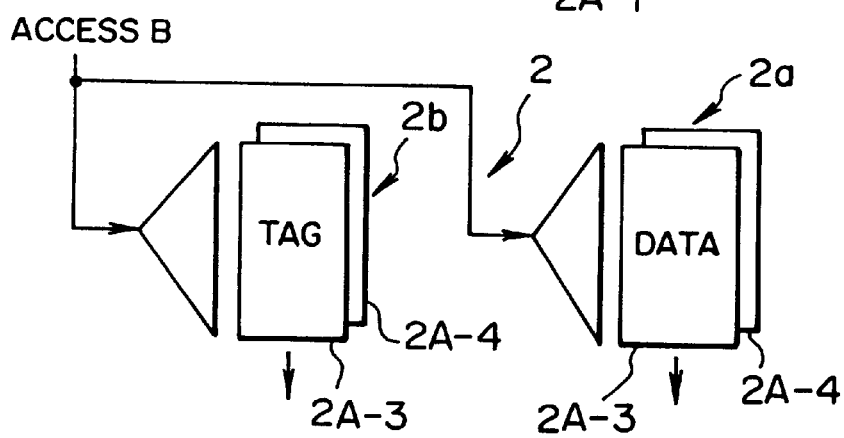
FIG.2(b)
FIG.3
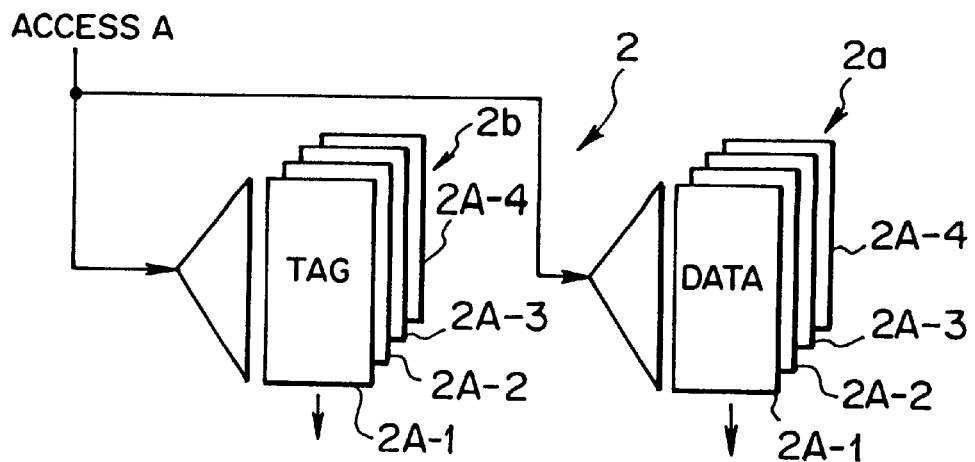

FIG.24

| PREFERENTIAL WAY | | ACCESS EXECUTED | | | |
|---|---|---|---|---|---|
| A | B | α | β | γ | δ |
| α | β | A | B | A | B |
| α | γ | A | A | B | B |
| α | δ | A | A | B | B |
| β | α | B | A | A | B |
| β | γ | A | A | B | B |
| β | δ | A | A | B | B |
| γ | α | B | B | A | A |
| γ | β | B | B | A | A |
| γ | δ | A | B | A | B |
| δ | α | B | B | A | A |
| δ | β | B | B | A | A |
| δ | γ | A | B | B | A |

CACHE MEMORY DEVICE AND METHOD FOR PROVIDING CONCURRENT INDEPENDENT MULTIPLE ACCESSES TO DIFFERENT SUBSETS WITHIN THE DEVICE

BACKGROUND OF THE INVENTION

1) Field of the Invention

The present invention relates to a multi-access method for a storage level including a plurality of pairs, each composed of a data array and a tag array, in an information processing apparatus including a plurality of storage levels, and further to a technique applied to a cache memory device which is interposed between a processor and a storage device so as to speed up a data read in the information processing apparatus. Particularly, the invention relates to a multi-access method and a multi-access cache memory device which enable multi-access.

2) Description of the Related Art

Conventionally, a large quantity of hardware is required for concurrently performing a plurality of accesses (multi-access) to a set associative type cache memory.

For example, according to a technique disclosed in Japanese Patent Application Laid-Open (kokai) No. 64-23354, a plurality of cache memories (buffer memory devices) are provided. When a write request is issued with respect to data shared by cache memories, a write is performed for all cache memories which share the data. In addition to this technique, various other protocols are known. These techniques require a plurality of cache memories themselves, resulting in a quite large quantity of hardware.

According to a technique disclosed in Japanese Patent Application Laid-Open (kokai) No. 1-280860, a multi-port memory is used as a cache memory so as to enable multi-access. However, this technique requires a larger number of gates, resulting in a quite large quantity of hardware. Also, this technique has a problem that this type of memory is not suited for high-speed operation.

Japanese Patent Application Laid-Open (kokai) No. 4-199242 discloses a cache memory device in which only the address array of each way has a multi-structure. As shown in FIGS. 30(a) and 30(b), this cache memory device includes two address arrays (tag arrays) 100A and 100B. The content of the address array 100A is a duplicate of that of the address array 100B. That is, the address arrays 100A and 100B have the same content.

FIGS. 30(a) and 30(b) show a 4-way set associative type cache memory device in which each of the address arrays 100A and 100B is divided into four according to the number of ways. As shown in FIG. 31, the data array 102 is also divided such that a read/write is enabled way by way. These divided data arrays 102 are shared by the two address arrays 100A and 100B.

In the above-described cache memory device, when two accesses A and B are received concurrently as a first step as shown in FIGS. 30(a) and 30(b), each of the address arrays 100A and 100B is searched through using as an index a part of an actual address assigned to each of the accesses A and B. When the search provides a result, the result (actual address) of the search is compared with an actual address received in conjunction with each of the accesses A and B by comparators 101A and 101B, respectively, thereby determining a level (memory hierarchy, way) where data required by each of the accesses A and B is present.

When levels (ways) obtained through comparison by the comparators 101A and 101B are not the same, as a second step, multiple accesses are performed to data (DATA1, DATA3) which are present in data arrays 102 of different levels (ways) as shown in FIG. 31.

However, even in this cache memory device, the quantity of hardware becomes larger due to employing the multi-structure of the address arrays 100A and 100B. Also, an access cannot be performed to a data array before a level (way) is determined. That is, an access to the address arrays 100A and 100B and an access to the data array 102 (see FIG. 31) cannot be performed concurrently, resulting in a failure to significantly speed up multi-access processing.

As described above, the conventional methods for multi-access to a cache memory cause an increase in quantity of hardware and fail to significantly speed up multi-access processing.

SUMMARY OF THE INVENTION

The present invention has been accomplished in view of the foregoing problems, and an object of the present invention is to enable multi-access while suppressing an increase in quantity of hardware and speeding up processing.

The present invention provides a multi-access method for multi-access to a memory hierarchy including a plurality of pairs, each composed of a data array which holds data to be accessed and a tag array which holds tag information for specifying data held in the data array. When a plurality of access requests are received, the plurality of pairs are divided into a plurality of non-overlapping subsets, and information which accompanies each access request and which specifies data to be accessed (hereinafter referred to as "access-data-specifying information") is supplied to each of the subsets, thereby performing an access in accordance with each access request.

The present invention provides a multi-access cache memory device comprising: a cache mechanism including a plurality of pairs, each composed of a data array for holding data to be accessed and a tag array for holding tag information for specifying data held in the data array, in an information processing apparatus including a plurality of storage levels; a plurality of input ports for concurrently receiving a plurality of access requests; a switching mechanism which is interposed between the plurality of input ports and the cache mechanism and which selectively supplies access-data-specifying information, which is input in conjunction with the access request via one of the input ports, to one of the pairs of the data array and the tag array within the cache mechanism; and a switching mechanism control unit for controlling the state of switching of the switching mechanism such that upon receiving two or more access requests via the plurality of input ports, the plurality of pairs are divided into two or more non-overlapping subsets and subsequently access-data-specifying information, which accompanies each access request, is supplied to each of the relevant subsets, thereby performing accesses in parallel in accordance with the access requests.

As described above, according to the multi-access method and the multi-access cache memory device of the present invention, two or more pairs (each pair composed of a data array and a tag array) are divided into two or more subsets, and accesses can be performed to the relevant subsets in parallel. Accordingly, multi-access can be performed while an increase in quantity of hardware is suppressed and processing is speeded up. The present invention is particularly applicable to a cache memory for a high-performance parallel-processing architecture including a few processors with a common cluster.

BRIEF DESCRIPTION OF THE DRAWINGS

FIGS. 2(a) and 2(b) are diagrams for explaining the basic principle of a multi-access method according to the present invention;

FIG. 3 is a diagram for explaining the operation of the invention when a single access request is received;

FIG. 24 is a table for explaining preferential ways assigned in the first embodiment and accesses to be actually performed in the ways;

DESCRIPTION OF THE PREFERRED EMBODIMENTS (A) Aspect of the Invention

Figure 1:
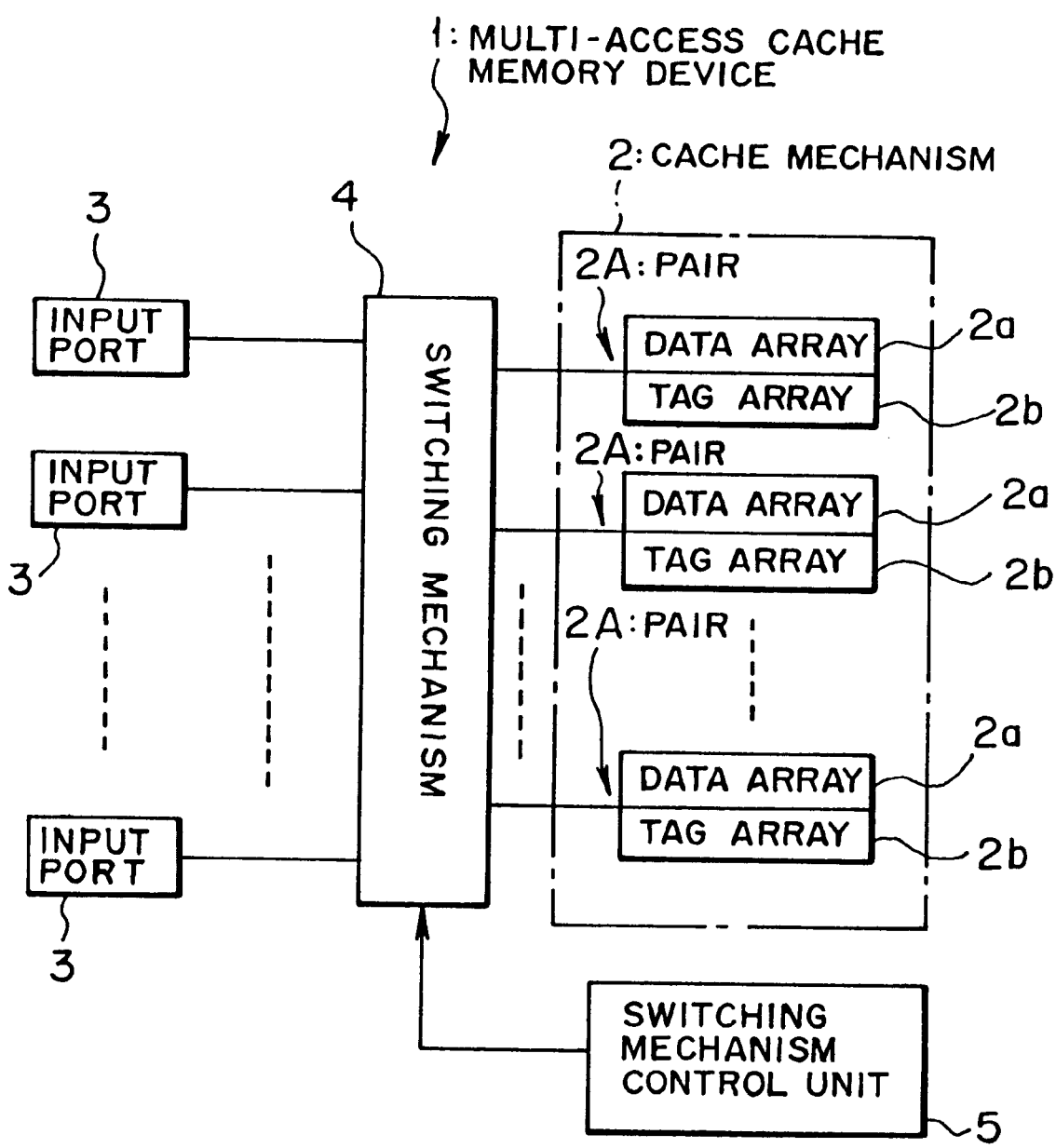
FIG. 1 is a block diagram showing an aspect of the present invention.

FIG. 1 is a block diagram showing an aspect of the present invention. As shown in FIG. 1, a multi-access cache memory device 1 of the invention is composed of a cache mechanism 2, input ports 3, a switching mechanism 4, and a switching mechanism control unit 5.

The cache mechanism 2 has a plurality of pairs 2A, each composed of a data array 2a holding data to be accessed and a tag array 2b holding tag information for identifying data held in the corresponding data array 2a.

A plurality of input ports 3 are provided for concurrently receiving a plurality of access requests.

The switching mechanism 4 is interposed between the plurality of input ports 3 and the cache mechanism 2 and selectively supplies access-data-specifying information (address, other identifier or the like), which is input in conjunction with an access request via one of the input ports 3, to one of the pairs 2A composed of the corresponding data array 2a and the corresponding tag array 2b within the cache mechanism 2.

Upon receiving two or more access requests via the plurality of input ports 3, the switching mechanism control unit 5 controls the state of switching of the switching mechanism 4 so as to divide the plurality of pairs 2A into two or more non-overlapping subsets and subsequently supply access-data-specifying information, which accompanies each access request, to each of the relevant subsets, thereby performing accesses in parallel in accordance with the access requests.

When a single access request is received at one of the plurality of input ports 3, the switching mechanism control unit 5 controls the state of switching of the switching mechanism 4 so as to supply to all pairs 2A access-data-specifying information which accompanies the single access request, thereby performing an access in accordance with the single access request.

In this case, each pair 2A may be handled as a way, assuming that the cache mechanism 2 operates under a set associative method.

When it is found, as a result of performing an access to each subset in accordance with each access request, that data to be accessed by a certain request is not held in the corresponding subset, the switching mechanism control unit 5 controls the state of switching of the switching mechanism 4 so as to supply access-data-specifying information which accompanies the certain access request, to a pair 2A not belonging to the subset, thereby performing an access to the pair 2A in accordance with the access request.

In the above case of performing accesses to subsets in accordance with access requests, before it is determined whether or not a certain subset holds data-to-be-accessed for a certain access request, the switching mechanism control unit 5 may control the state of switching of the switching mechanism 4 so as to supply access-data-specifying information which accompanies the access request, to a pair 2A not belonging to the subset to thereby perform an access to the pair 2A in accordance with the access request.

A cache mechanism control unit is provided for performing control so as to carry out the below described read from a storage device and write into the cache mechanism 2. When it is found that none of pairs 2A hole in its corresponding data array 2a data to be accessed from a certain access request, it is determined that the access request has been mis-hit in the cache mechanism 2. Thus, the data is read from the storage device based on access-data-specifying information which accompanies the access request, and the read data is written into the cache mechanism 2.

In this case, the cache mechanism control unit may reference the pairs 2A for the last time of access to data stored therein and subsequently perform control so as to write the data which was read from the storage device due to the judgment of a mishit, into the pair 2A which holds oldest data.

A priority assigning function may be provided for previously assigning data storage priority to each pair 2A of the cache mechanism 2 in accordance with access requester information.

In this case, the cache mechanism control unit references each pair 2A for its data storage priority which was previously assigned thereto by the priority assigning function in accordance with access requester information of an access request which proved to be a mishit. The cache mechanism control unit then performs control so as to preferentially write data which was read from the storage device due to the judgment of a mishit, into a pair 2A having a higher data storage priority. When free space into which data is written is not available in the pair 2A having a higher data storage priority, the cache mechanism control unit performs control so as to write the data read from the storage device into another pair 2A having free space, ignoring data storage priority. When none of the pairs 2A has free space for containing data, the cache mechanism control unit performs control so as to write the data into a pair 2A having a higher data storage priority. Further, when as a result of referencing each of the pairs 2A for the last time of access to data stored therein, a pair 2A having a higher data storage priority is found to contain the latest data, the cache mechanism control unit may perform control so as to write the data into the pair 2A holding the oldest data.

When none of the pairs 2A has free space for containing data, the cache mechanism control unit may reference each of the pairs 2A for the last time of access to data stored therein and perform control so as to write the data read from the storage device into the pair 2A holding the oldest data.

Also, the switching mechanism control unit 5 may reference each of the pairs 2A for its data storage priority which was previously assigned thereto by the priority assigning function in accordance with access requester information of an access request received via any of the plurality of input ports 3, and control the state of switching of the switching mechanism 4 so as to preferentially supply access-data-specifying information which accompanies the access request, to a subset which contains a pair 2A having a higher data storage priority, thereby performing an access to the subset in accordance with the access request.

The following data is used as the above-described access requester information used in assignment of data storage priority.

(1) Process identifier set for each process to be performed by at least one processor which accesses the cache mechanism 2.

(2) Thread identifier set for each thread to be performed by at least one processor which accesses the cache mechanism 2.

(3) Information (processor No. or the like) to identify each processor when there exist a plurality of processors which access the cache mechanism 2.

(4) Address serving as access-data-specifying information which accompanies an access request.

When the switching mechanism control unit 5 controls the state of switching of the switching mechanism 4 in accordance with data storage priority, a move instructing function may be provided for moving data from a predetermined pair 2A in the cache mechanism 2 to another pair 2A in the cache mechanism 2.

Further, a snoop mechanism may be provided which has a duplicate tag array of each tag array 2b in each pair 2A and which functions as follows. When it is found, as a result of performing an access to each subset in accordance with each access request, that data to be accessed by a certain access request is not held in the corresponding subset, the snoop mechanism supplies access-data-specifying information which accompanies the access request, to a pair 2A not belonging to the subset so as to determine whether or not the pair 2A holds data-to-be-accessed for the access request based on tag information held in the duplicate tag array of the pair 2A and the access-data-specifying information. Thus, the snoop mechanism identifies a pair 2A, if any, which holds data-to-be-accessed for the access request.

Referring to FIGS. 2 to 18, the basic principle of multi-access to the cache mechanism 2 and the basic operation of the multi-access cache memory device 1 will be briefly described.

In an example shown in FIGS. 2 to 18, the cache mechanism 2 operates under a set associative method and is composed of four ways (pairs) 2A-1 to 2A-4, each way composed of a pair, which, in turn, is composed of the data array 2a holding data-to-be-accessed and the tag array 2b holding tag information for identifying data held in the corresponding data array 2a.

According to the present invention, two or more ways are divided into two or more groups, different accesses to different groups are allowed, and a single access is performed to ways within the same group.

For example, as shown in FIGS. 2(a) and 2(b), when two accesses A and B to the cache mechanism 2 are concurrently requested, the ways 2A-1 to 2A-4 are divided into a group (subset) of the ways 2A-1 and 2A-2 and a group (subset) of the ways 2A-3 and 2A-4 while the attainment of a higher hit ratio is taken into consideration as described later.

The switching mechanism control unit 5 controls the state of switching of the switching mechanism 4 so as to supply access-data-specifying information (for example, address) which accompanies accesses A and B, to respective groups, as shown in FIGS. 2(a) and 2(b), thereby performing accesses A and B in parallel.

As shown in FIG. 3, when there exists only a single access request (access A), the switching mechanism control unit 5 controls the state of switching of the switching mechanism 4 so as to supply access-data-specifying information which accompanies access A, to all the ways 2A-1 to 2A-4, thereby performing access A using all the ways 2A-1 to 2A-4.

Figure 4:
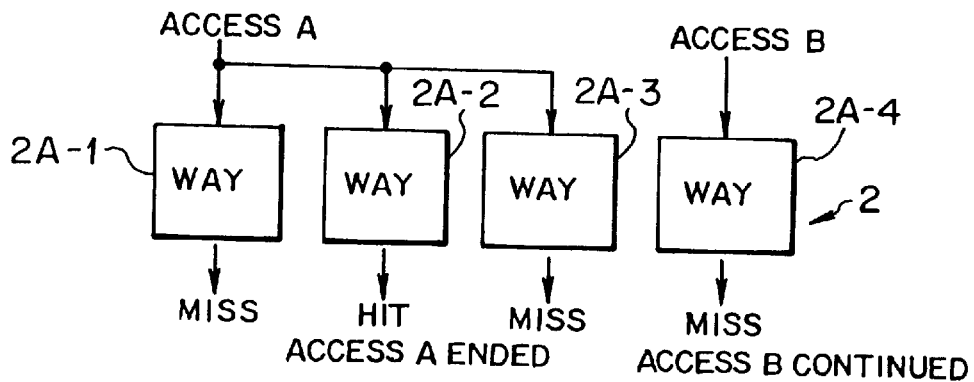
FIGS. 4 to 6 are diagrams for explaining the operation of the invention when data is misfit at an initial access.

As shown in FIG. 4, suppose the following: the switching mechanism control unit 5 controls the switching mechanism 4 so as to perform access A in a group of the ways 2A-1 to 2A-3 and to simultaneously perform access B in the way 2A-4; access A has hit data in the way 2A-2 (data-to-be-accessed is held in the data array 2a of the way 2A-2); and access B has mishit data in the way 2A-4 (data-to-be-accessed is not held in the data array 2a of the way 2A-4). In this case, access A ends because data was hit in the way 2A-2 while access B continues processing because data was mishit in the way 2A-4.

Figure 5:
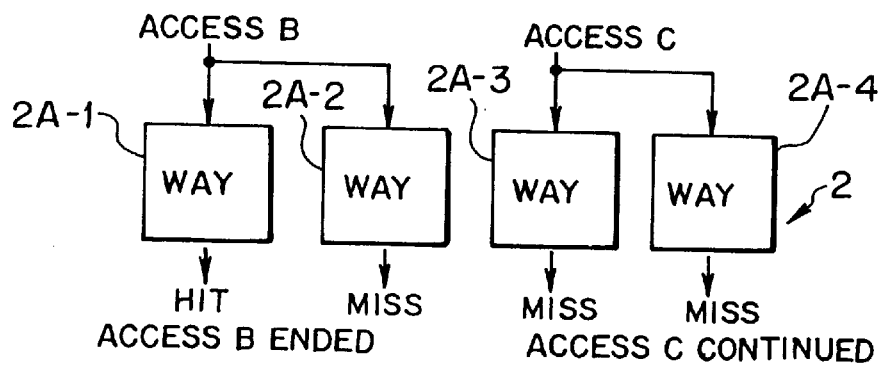

That is, as shown in FIG. 5, the switching mechanism control unit 5 controls the switching mechanism 4 so as to perform access B in a group other than the group containing the way 2A-4, i.e. in a group of the ways 2A-1 and 2A-2. In FIG. 5, another access C is received and performed in a group of the ways 2A-3 and 2A-4 while access B is performed. Since access B has hit data in the way 2A-1 at this time, access B ends.

Figure 6:
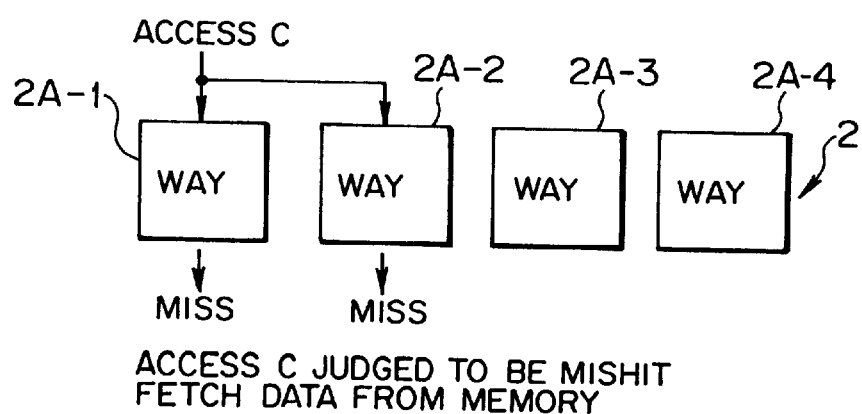

Since access C has mishit data in the ways 2A-3 and 2A-4, access C continues processing. As shown in FIG. 6, the switching mechanism control unit 5 controls the switching mechanism 4 so as to perform access C in a group other than the group of the ways 2A-3 and 2A-4, i.e. in the group of the ways 2A-1 and 2A-2. Since access C has again mishit data in the ways 2A-3 and 2A-4, i.e. access C has mishit data in all the ways 2A-1 to 2A-4 in the cache mechanism 2, it is determined that access C to the cache mechanism 2 has mishit data therein. In this case, a request for access to a storage device (main storage or like memory) is issued to read relevant data from the storage device based on access-data-specifying information which accompanies access C, and the thus read data is written into the cache mechanism 2.

As shown in FIGS. 4 to 6, after it becomes definite that data has been mishit in a group, an access is performed only to remaining ways, thereby reducing a traffic ratio. However, before it becomes definite that data has been mishit, an access may be issued to a remaining way(s) for speeding up processing.

When data read from a storage device is written into the cache mechanism 2, by writing the data into one of the ways 2A-1 to 2A-4 which holds the oldest data, it becomes possible to continue holding newer data which has a higher potential of being accessed (employment of LRU (Least Recently Used)).

Also, by performing an access, for write/read, to the ways 2A-1 to 2A-4 in the cache mechanism 2 in accordance with data storage priority which was previously assigned to the ways, a hit ratio (particularly, a hit ratio at an initial access) can be improved.

FIGS. 7 to 14 show data storage in accordance with data storage priority. In this case, suppose that since access C has mishit data, data is read from a storage device such as a main storage, and the thus read data needs to be stored in any of the ways 2A-1 to 2A-4. Also, suppose that data storage priority is assigned by the priority assigning function such that data for access C is preferentially stored into the way 2A-3.

Figure 7:
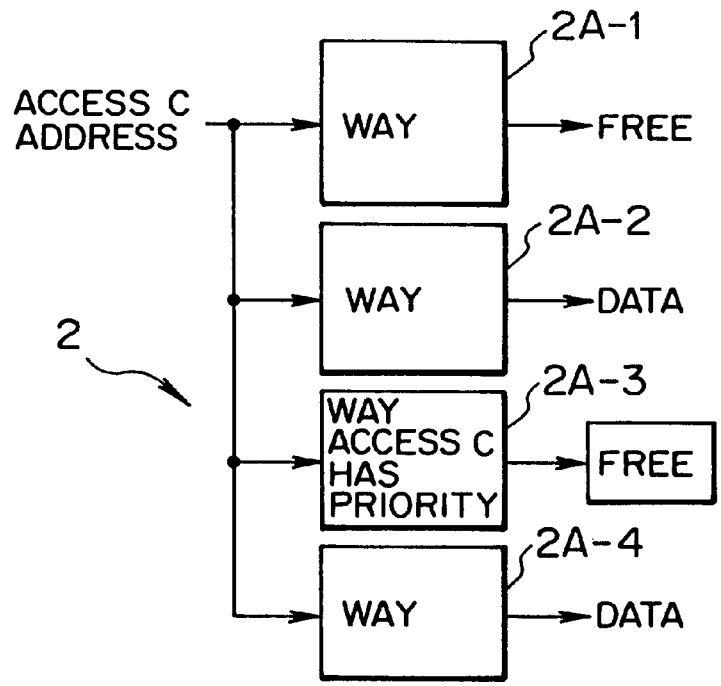
FIGS. 7 to 14 are diagrams for explaining the procedure of the invention for storing data in accordance with data storage priority.
Figure 8:
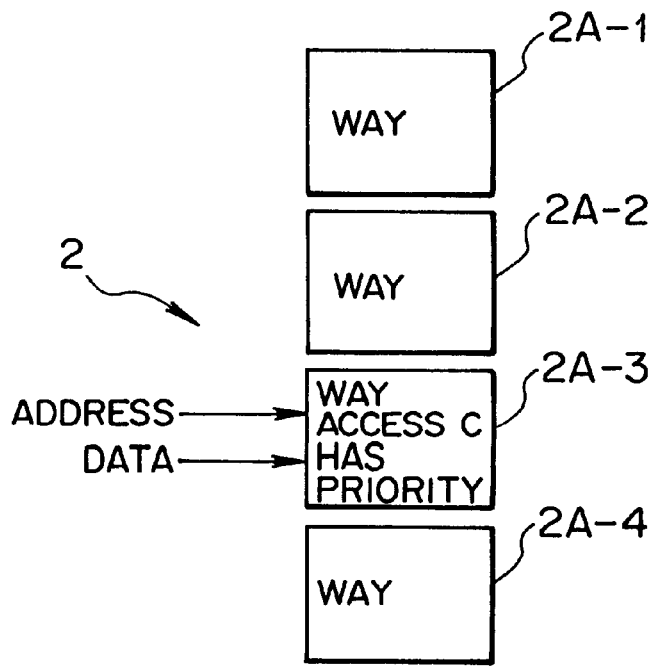

The cache mechanism control unit accesses the ways 2A-1 to 2A-4 to check whether the way 2A-3, which is preferentially accessible to access C, has free space. This access may be performed to all the ways 2A-1 to 2A-4 at a time or in divisions. When the way 2A-3 has free space as shown in FIG. 7, data read from a storage device is stored in the way 2A-3 as shown in FIG. 8. An address for specifying an entry in the data array 2a of the way 2A-3 where data is to be stored may be specified before or after a way where data is to be stored is determined.

Figure 9:
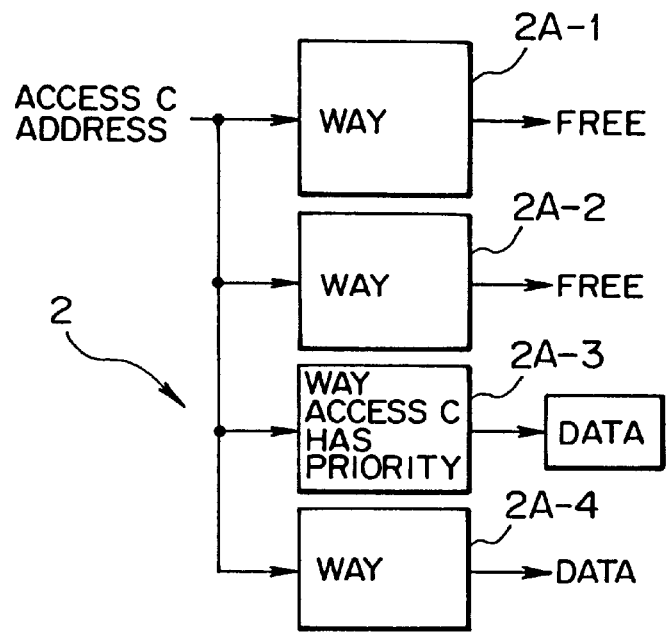
Figure 10:
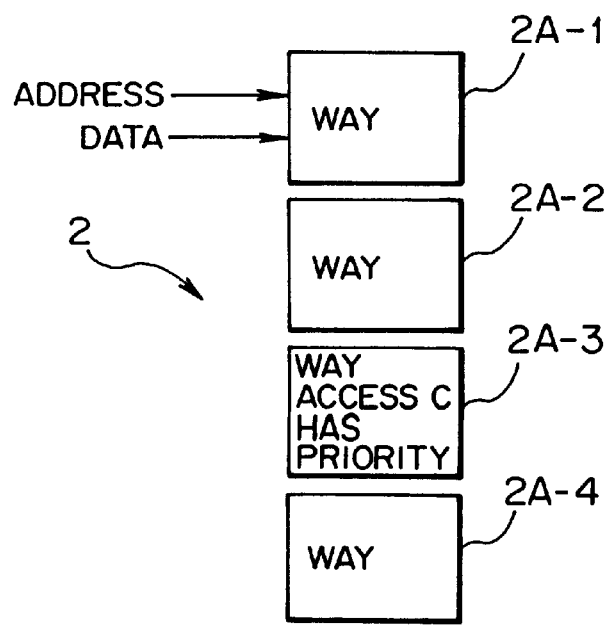

By contrast, when the preferential way 2A-3 has no free space as shown in FIG. 9, data is stored into another way 2A-1 having free space as shown in FIG. 10. When none of the ways 2A-1 to 2A-4 have free space for writing data thereinto, data is written into a way having the oldest data under the LRU method, whereby newer data having a higher potential of being accessed can be retained.

Figure 11:
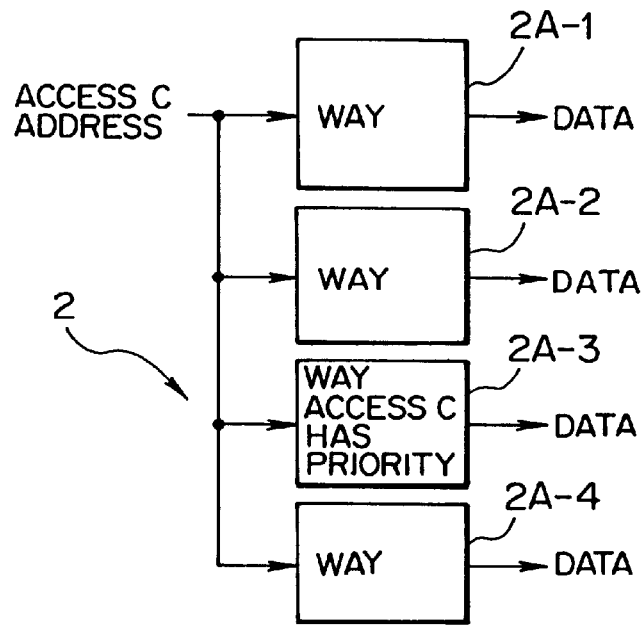
Figure 12:
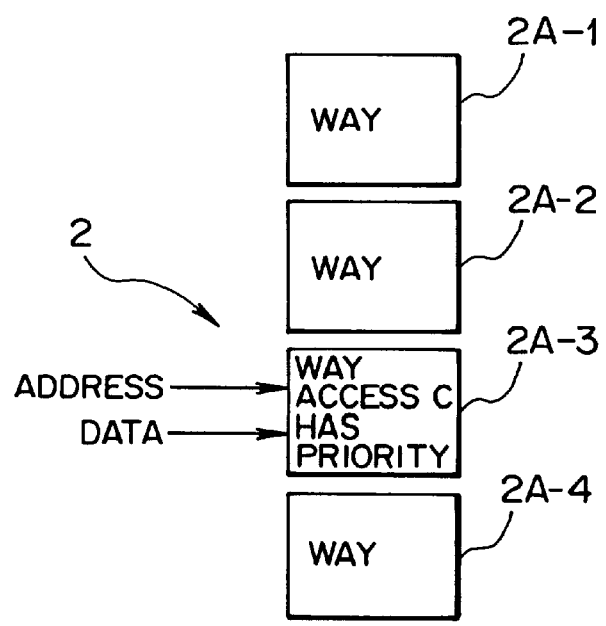

When none of the ways 2A-1 to 2A-4 have free space as shown in FIG. 11, data is written into the preferential way 2A-3 by overwriting data in the way as shown in FIG. 12.

Figure 13:
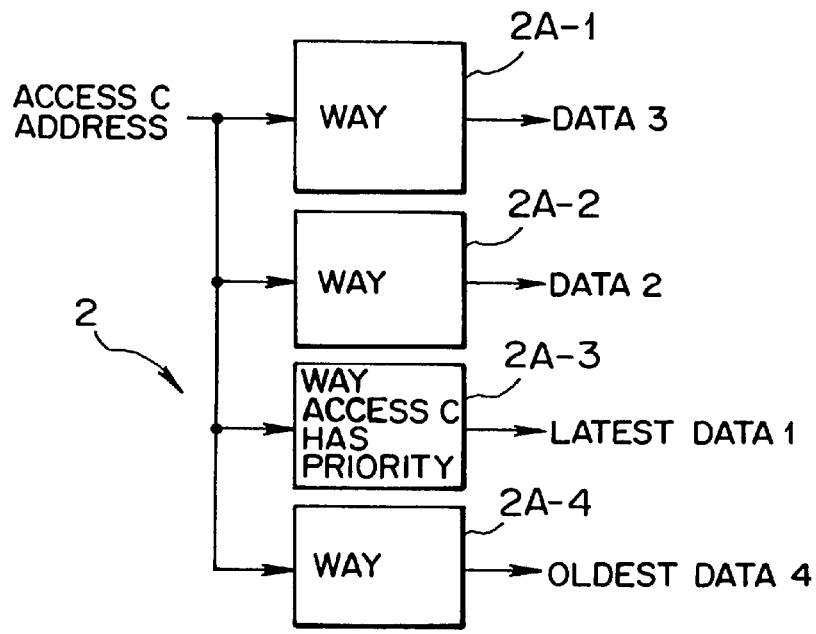
Figure 14:
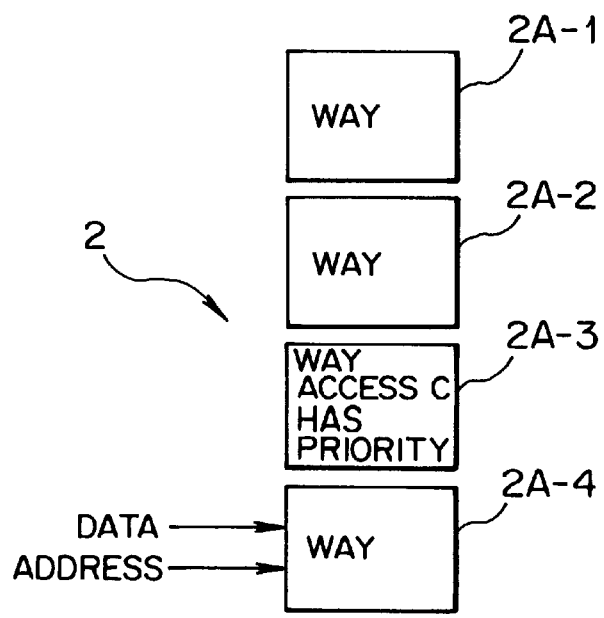

When none of the ways 2A-1 to 2A-4 have free space and the preferential way 2A-3 contains the latest data as shown in FIG. 13, the LRU method is combined, because there is a large possibility that the latest data is immediately accessed later on. In this case, data is written to another way 2A-4 containing the oldest data, not the preferential way 2A-3, as shown in FIG. 14. Thus, the latest data can be retained.

FIGS. 15 to 18 show examples of access requester information used in assignment of data storage priority.

Figure 15:
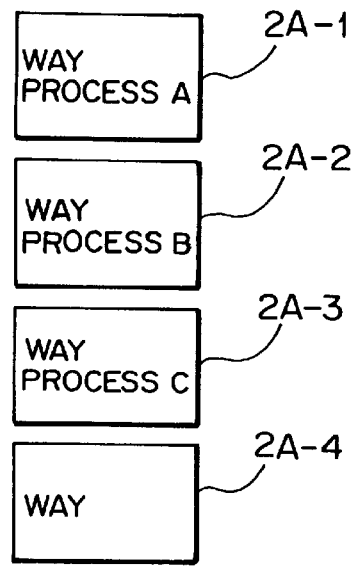
FIG. 15 is a diagram for explaining access requester information (process identifier) for assigning data storage priority.
Figure 16:
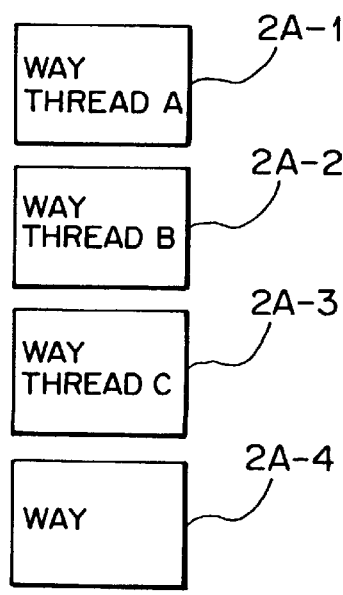
FIG. 16 is a diagram for explaining access requester information (thread identifier) for assigning data storage priority.

As described previously, in order to improve a hit ratio at an initial access, data storage priority is assigned to the ways 2A-1 to 2A-4 where data is stored. Specific assignment of data storage priority is performed as follows. As shown in FIG. 15, process Nos. (process identifiers represented by processes A to C in FIG. 15) may be explicitly specified to assign data storage priority to the ways 2A-1 to 2A-4. Alternatively, as shown in FIG. 16, thread Nos. (thread identifiers represented by threads A to C in FIG. 16) may be explicitly specified to assign data storage priority to the ways 2A-1 to 2A-4.

Figure 17:
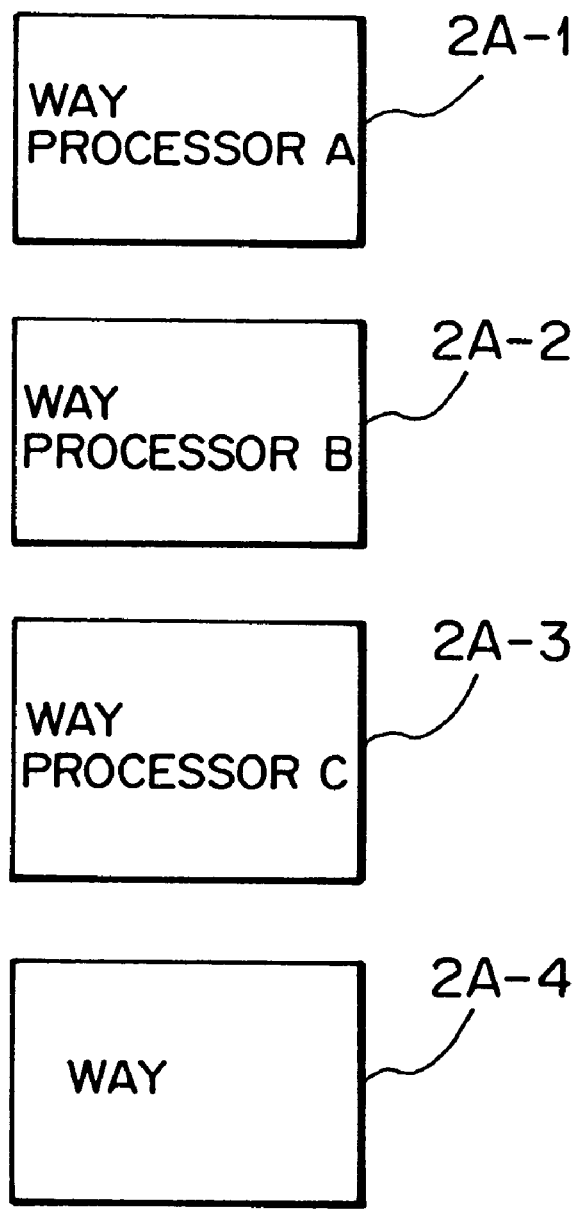
FIG. 17 is a diagram for explaining access requester information (processor No.) for assigning data storage priority.

Also, when a plurality of processors are provided, as shown in FIG. 17, processor Nos. (processors A to C in FIG. 17) may be specified to assign data storage priority to the ways 2A-1 to 2A-4.

Figure 18:
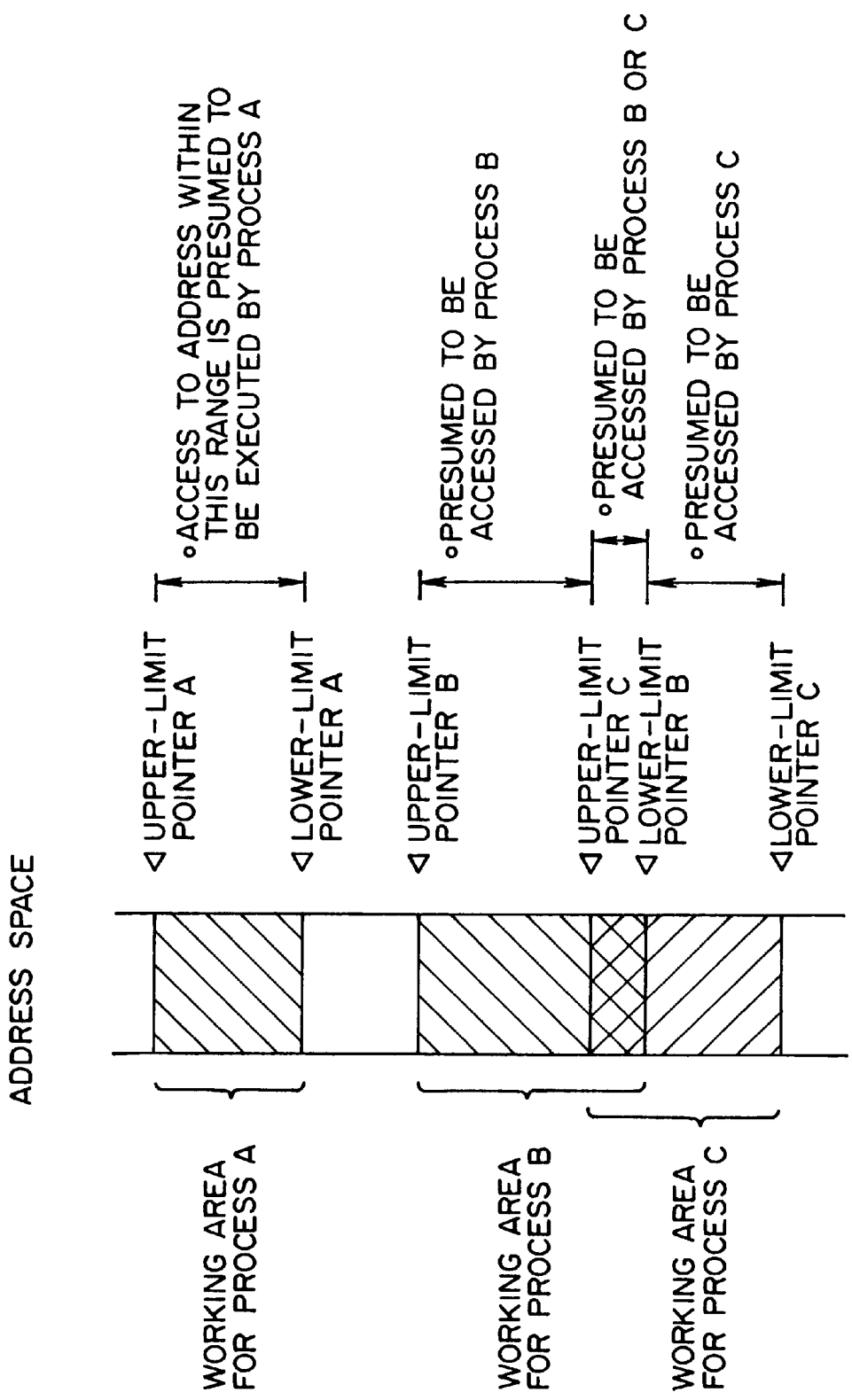
FIG. 18 is a diagram for explaining access requester information (address) for assigning data storage priority.

When process Nos. or like identifiers are not explicitly specified, as shown in FIG. 18, upper-limit pointers A to C and corresponding lower-limit pointers A to C are provided for specifying working areas for respective processes A to C. Based on the address of data-to-be-accessed and indication addresses corresponding to the upper-limit pointers A to C and the lower-limit pointers A to C, a process No. or like identifier is presumed from which address area in the address space of the cache mechanism 2 the address of data-to-be-accessed is located. Thus, data storage priority can be determined for the ways 2A-1 to 2A-4.

For example, in FIG. 18, the upper-limit pointer A and the lower-limit pointer A specify the working area of process A. When an access is performed to an address located between addresses indicated by the upper-limit pointer A and the lower-limit pointer A, the access is presumed to be that of process A.

In FIG. 18, a working area for process B overlaps with that for process C. In this case, when an access is performed to an address located between addresses indicated by the upper-limit pointer B and the upper-limit pointer C, the access is presumed to be that of process B. When an access is performed to an address located between addresses indicated by the upper-limit pointer C and the lower-limit pointer B, it is determined that the access can be handled as that of process B or C. When an access is performed to an address located between addresses indicated by the lower-limit pointer B and the lower-limit pointer C, the access is presumed to be that of process C.

Based on the above-described presumption of processes, data storage priority is assigned to the ways 2A-1 to 2A-4 while avoiding double assignment if possible. Here, processes have been presumed based on addresses. However, process Nos., thread Nos., processor Nos. or the like may be presumed for assignment of data storage priority.

When an access is performed in accordance with data storage priority, data stored in a certain way (pair) may be moved to another way (pair) which is assigned a higher data storage priority in accordance with a process, thread, processor or the like (identified by access requester information) having a higher potential of accessing the data, thereby improving a hit ratio at an initial access.

For an access which has mishit data at an initial trial, a duplicate tag array in the snoop mechanism is used to determine whether or not data-to-be-accessed is present in a corresponding data array. Thus, a normal access and a snoop processing for an access which has mishit data can be performed in parallel.

In FIGS. 2 to 18, the cache mechanism 2 operates under the set associative method with four ways, and two accesses are concurrently requested. The present invention, however, is not to be limited to this.

As described in detail above, according to the multi-access method and the multi-access cache memory device 1 of the present invention, two or more pairs (each pair composed of data array 2a and tag array 2b) 2A are divided into two or more subsets, and accesses to respective subsets can be performed in parallel, whereby multi-access can be performed while an increase in quantity of hardware is suppressed and processing is maintained at a higher speed. The multi-access method and the multi-access cache memory device 1 are particularly applicable to a high-performance parallel-processing architecture including a few processors having a common cluster.

The multi-access method and the multi-access cache memory device of the present invention are also applicable to a built-in cache memory of a superscalar type processor provided with a plurality of load/store units and a VLIW type processor. Further, the multi-access method and the multi-access cache memory device are quite advantageous to thread switching which utilizes a multi-thread architecture in order to conceal latency due to a mishit in a cache.

When only a single access request is present, the access is performed using all pairs, thereby conducting processing in a manner similar to conventional one.

After it becomes definite that data has been mishit in a subset, an access is continued only in those subsets other than that where data was mishit, thereby reducing a traffic ratio. Further, before it becomes definite that data has been mishit in a subset, an access may be issued to other pairs, thereby speeding up processing.

When it becomes definite that data has been mishit in the cache mechanism 2, data read from a storage device is written into a pair holding the oldest data, thereby retaining newer data having a higher potential of being accessed.

Also, by performing an access, for write/read, to the pairs 2A in the cache mechanism 2 in accordance with data storage priority which was previously assigned to the pairs, a hit ratio at an initial access is significantly improved, thereby speeding up multi-access to the cache mechanism 2.

In this case, by moving data stored in a certain pair 2A to another pair which is assigned a higher data storage priority in accordance with a process, thread, processor or the like (identified by access requester information) having a higher potential of accessing the data, a hit ratio at an initial access can be improved, thereby speeding up multi-access.

Further, by performing in parallel a normal access and a snoop processing for an access which has mishit data at an initial trial, multi-access can be further speeded up.

(B) First Embodiment

Figure 19:
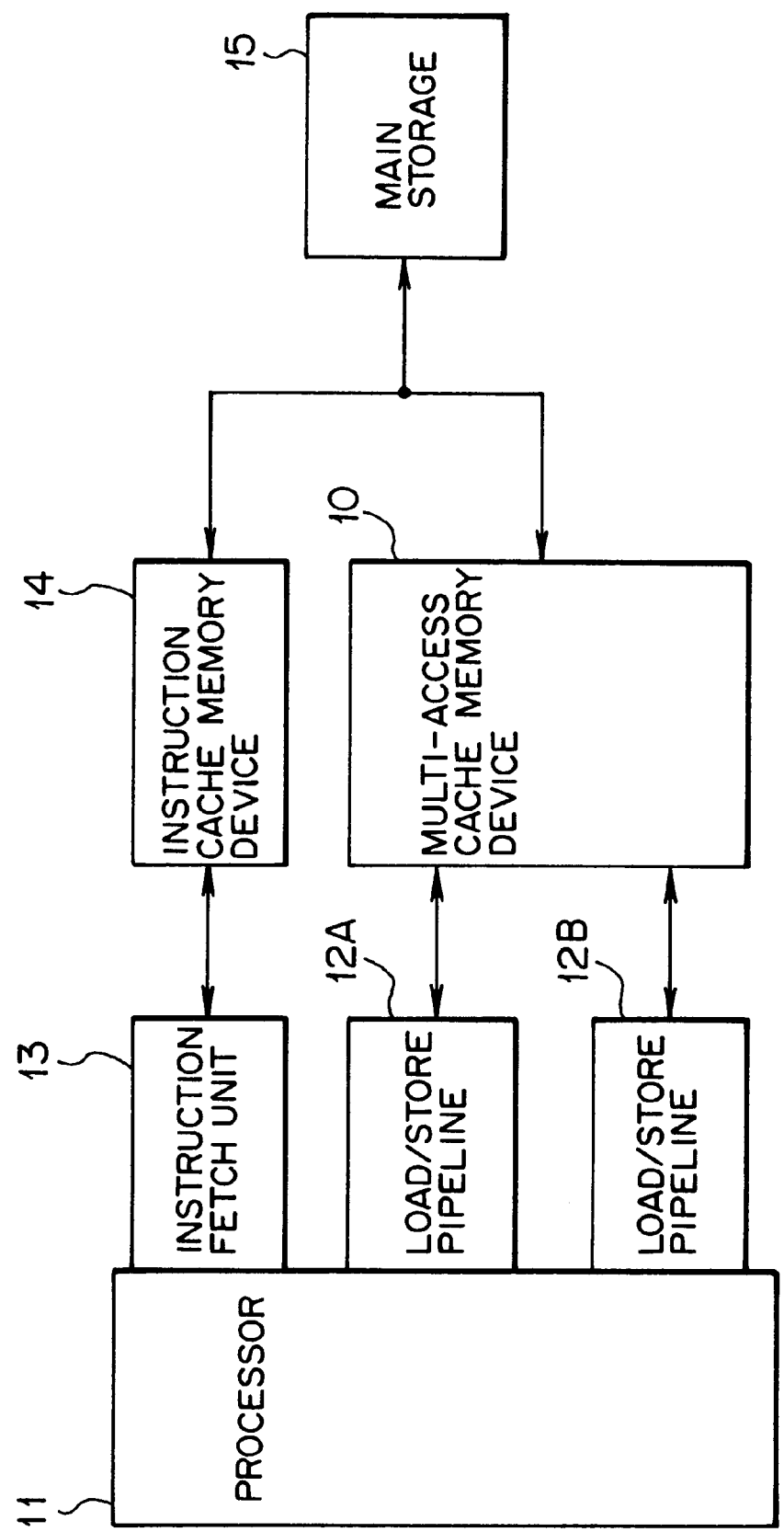
FIG. 19 is a block diagram showing the overall configuration of a system to which a first embodiment of the present invention is applied.

FIG. 19 is a block diagram showing the overall configuration of a system to which a first embodiment of the present invention is applied. As shown in FIG. 19, a multi-access cache memory device 10 according to the first embodiment is used, for example, with a superscalar type processor 11.

The processor 11 is provided with two independent load/store pipelines 12A and 12B, which have a capability of concurrently accessing different addresses. These two pipelines 12A and 12B are provided for accessing data, but are prevented by the processor 11 to redundantly access the same data, thereby preventing redundant accesses to the same data. When accesses are not redundant, i.e. two accesses are requested to different data, the two accesses can be concurrently requested.

The processor 11 also has a separate unit 13 for fetching an instruction. The instruction fetch unit 13 is connected to an independent instruction cache memory device 14, not a multi-access cache memory device 10.

The processor 11 is connected to a main storage (storage device) 15 via the multi-access cache memory device 10 and the instruction cache memory device 14. The processor 11 accesses the cache memory devices 10 and 14 and performs a write into/read from the cache memory devices 10 and 14 when data-to-be-accessed is held in the cache memory devices 10 and 14. When data-to-be-accessed is not held in the cache memory devices 10 and 14, the cache memory devices 10 and 14 access the main storage 15 to read data-to-be-accessed from the main storage 15 for the processor 11.

Usually, the processor 11 does not execute an instruction while rewriting an instruction. The processor 11, therefore, does not care about redundantly accessing the same data. When an instruction is rewritten, the entire cache memory devices 10 and 14 are flushed (that is, required data is all written back into the main storage 15 from the cache memory devices 10 and 14, thereby invalidating an entry), thereby maintaining consistency of data.

Figure 20:
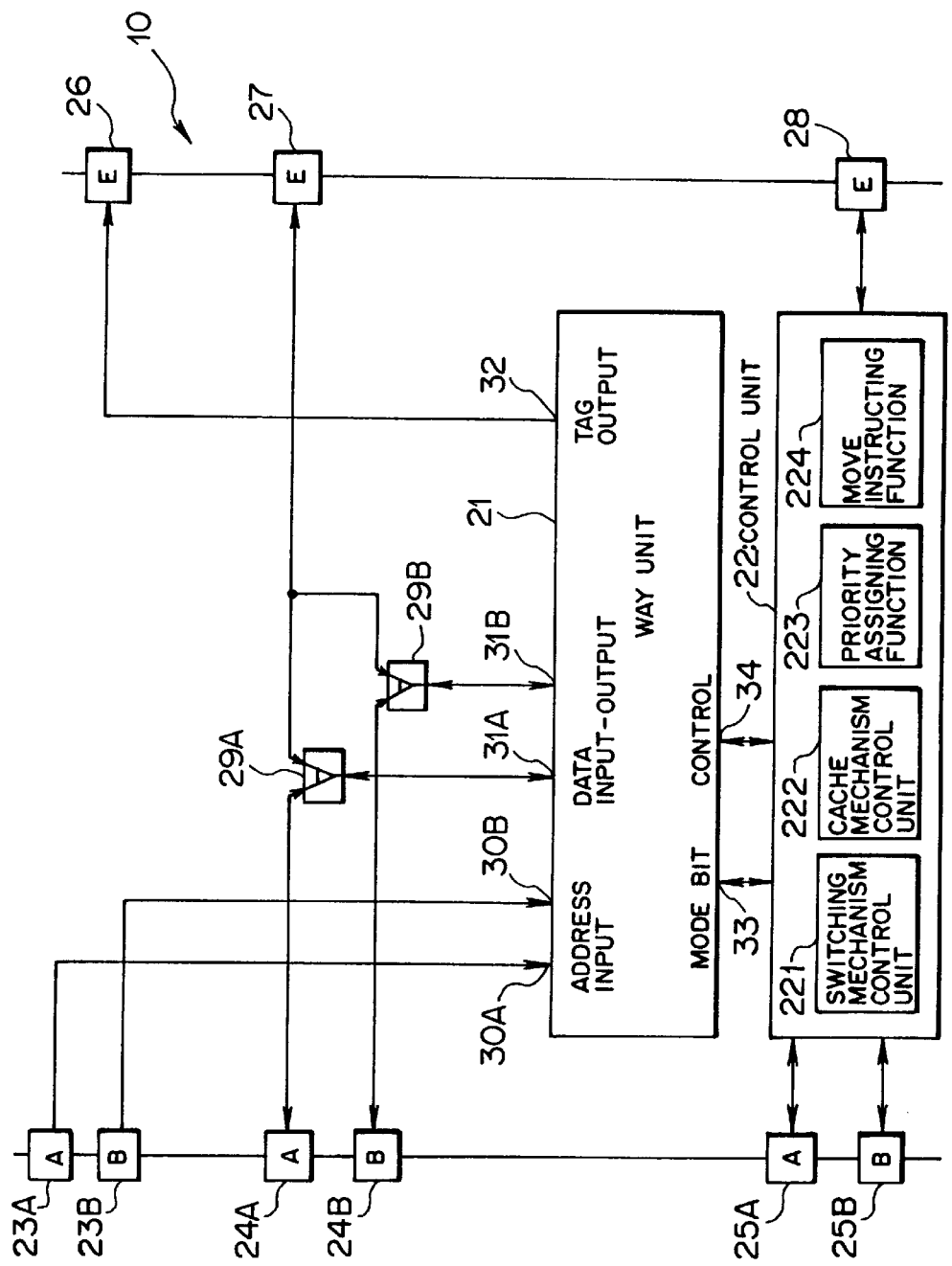
FIG. 20 is a block diagram showing the overall configuration of a multi-access cache memory device according to the first embodiment of the present invention.

FIG. 20 is a block diagram showing the overall configuration of the multi-access cache memory device 10 according to the first embodiment of the present invention. As shown in FIG. 20, the multi-access cache memory device 10 according to the first embodiment includes a way unit 21 (illustrated in detail in FIG. 22) containing a set of ways 40-1 to 40-4 and a control unit 22 having various functions (described later) and controlling the operation of the way unit 21 as well as address input ports 23A and 23B, data input-output ports 24A and 24B, control line input-output ports 25A and 25B, an address output port 26, data input-output port 27, and a control line input-output port 28.

The address input ports 23A and 23B, the data input-output ports 24A and 24B, and the control line input-output ports 25A and 25B are connected to the processor 11 shown in FIG. 19 to receive an access to the cache memory device 10 issued by the processor 11. These ports are provided in pairs so as to concurrently receive two accesses.

Figure 22:
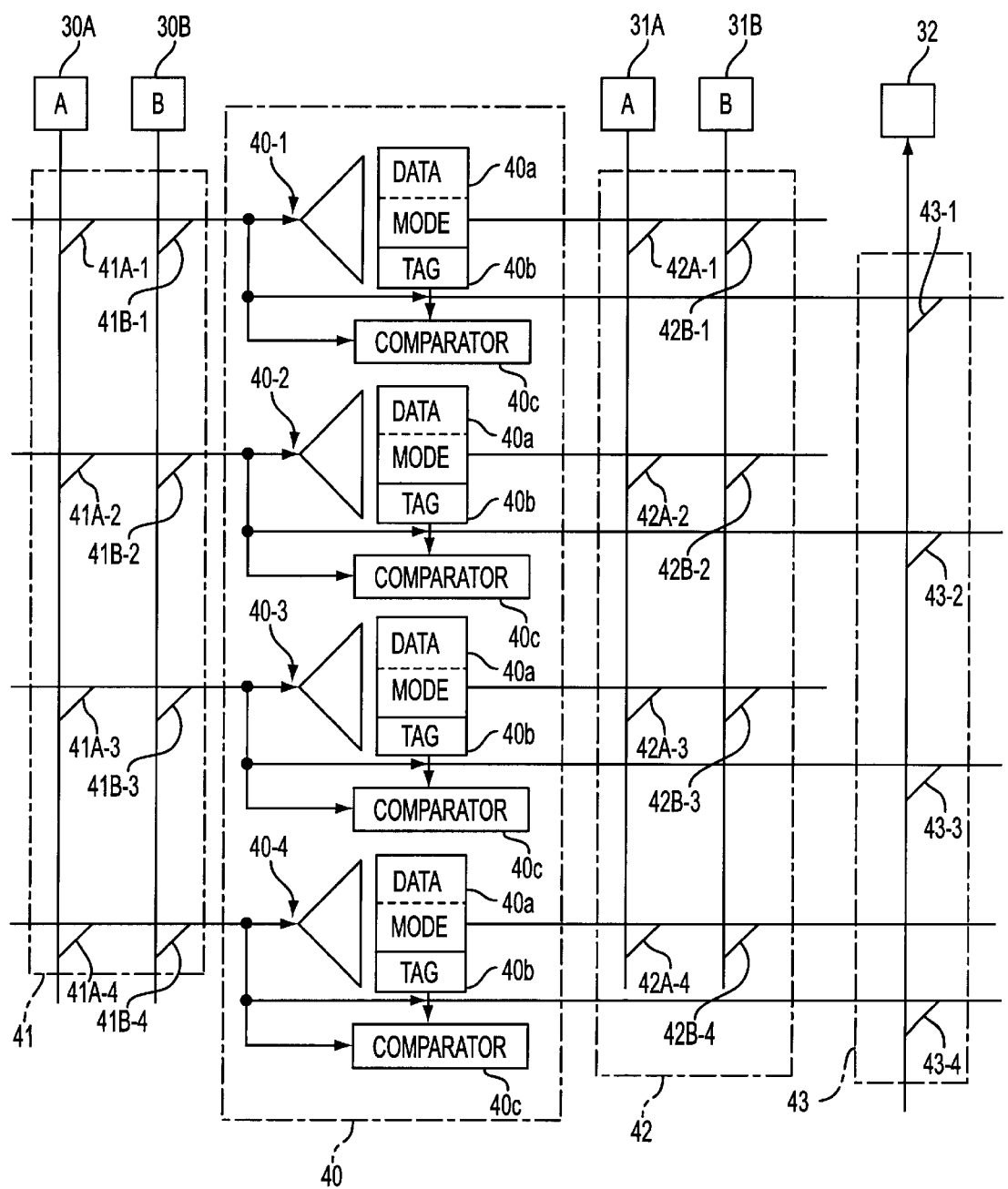
FIG. 22 is a block diagram showing the configuration of a way unit (cache mechanism and switching mechanism) in the first embodiment.

In the description below, an access received at the ports 23A to 25A and an access received at the ports 23B to 25B may be represented as access A and access B, respectively. In FIGS. 20 and 22, ports and terminals corresponding to accesses A and B are assigned symbols "A" and "B", respectively.

The address output port 26, the data input-output port 27, and the control line input-output port 28 are connected to the main storage 15 shown in FIG. 19 so as to access the main storage 15. In FIG. 20, ports connected to the main storage 15 are assigned symbol "E".

The way unit 21 is provided with address input terminals 30A and 30B, data input-output terminals 31A and 31B, a tag output terminal 32, a mode bit terminal 33, and a control terminal 34.

The address input terminals 30A and 30B and the tag output terminal 32 are directly connected to the address input ports 23A and 23B and the address output port 26, respectively.

The tag output terminal 32 outputs the following addresses to the main storage 15 through the address output port 26. When data contained in the way unit 21 (cache mechanism 40) is written back into the main storage 15 at a certain location, the address of the location in the main storage 15 is output to the main storage 15. When a mishit of data in the way unit 21 (cache mechanism 40) is detected, there is output to the main storage 15 an address for designating data-to-be-accessed which was mishit in the way and which is therefore to be read out from the main storage 15. An output from the tag output terminal 32 is of a high impedance when the above-described addresses are not output.

Figure 21:
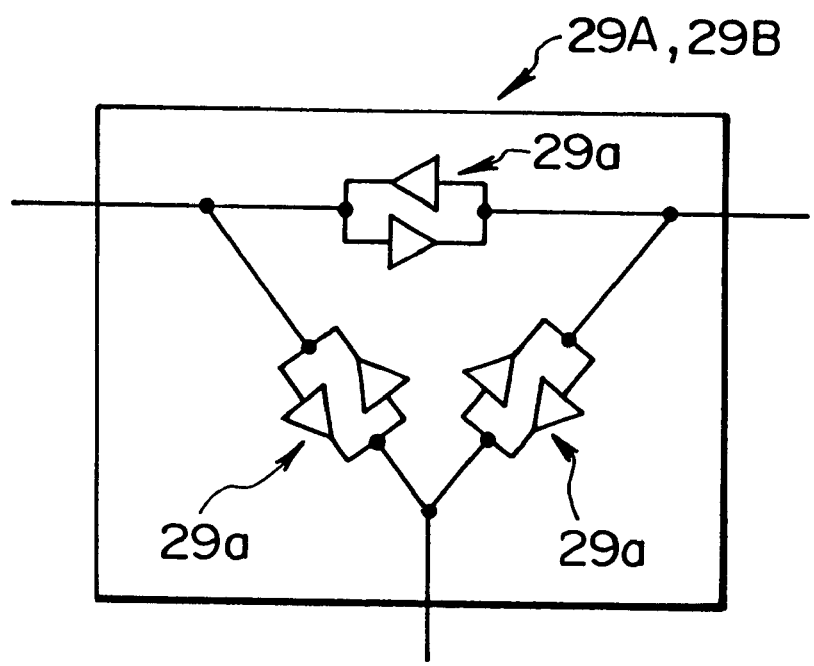
FIG. 21 is a diagram showing the configuration of a bidirectional switch.

The data input-output terminal 31A is freely connected either to the data input-output port 24A or to the data input-output port 27 connected to the main storage 15, via a bidirectional switch 29A. Likewise, the data input-output terminal 31B is freely connected either to the data input-output port 24B or to the data input-output port 27 connected to the main storage 15, via a bidirectional switch 29B. The bidirectional switches 29A and 29B, for example, have a structure as shown in FIG. 21 in which three bidirectional elements 29a are connected such that they are disposed on respective sides of a triangle.

The control line input-output ports 25A, 25B, and 28, the mode bit terminal 33, and the control terminal 34 are connected to the control unit 22. The control unit 22 transmits control information about accesses A and B to and from the processor 11 through the control line input-output ports 25A and 25B, and transmits control information about an access to the main storage 15 to and from the main storage 15 through the control line input-output port 28.

The control unit 22 has a function of controlling the state of the way unit 21 (which is composed of the cache mechanism 40 and crossbar switches 41 to 43 and will be described later with reference to FIG. 22) by transmitting various control signals to and from the way unit 21 via the control terminal 34 and a function of writing mode bit information (VALID, DIRTY, TIME, etc., which will be described later) into the data array 40a of each of ways 40-1 to 40-4 via the mode bit terminal 33 and reading mode bit information from the data array 40a via the mode bit terminal 33, as described later with reference to FIG. 22.

The control unit 22 of the present embodiment not only functions as a switching mechanism control unit 221 and a cache mechanism control unit 222 but also has a priority assigning function 223 and a move instructing function 224.

The switching mechanism control unit 221 controls the state of switching of the crossbar switches 41 to 43, which will be described later in detail with reference to FIG. 22.

The cache mechanism control unit 222 has a function of controlling an access (write/read) to the cache mechanism 40 (described later with reference to FIG. 22), a function of controlling the operation of writing data held in the cache mechanism 40 back into the main storage 15 when the data is overwritten due to an access from the processor 11, and a function of reading data from the main storage 15 for an access which has mishit data in the cache mechanism 40 and writing the read data into the cache mechanism 40.

The priority assigning function 223 assigns data storage priority to the ways 40-1 to 40-4 in the cache mechanism 40 in accordance with access requester information (process No., thread No. etc.). The switching mechanism control unit 221 and the cache mechanism control unit 222 perform a control operation in accordance with data storage priority assigned by the priority assigning function 223 and the results of comparison (judgment of hit/mishit) by comparators 40c, which will be described later.

Upon receiving an external instruction, the move instructing function 224 instructs the way unit 21 to move data from a predetermined way to another way of the cache mechanism 40.

The way unit 21, as shown in FIG. 22, is composed of the cache mechanism 40 and the crossbar switches (switching mechanism) 41 to 43.

The cache mechanism 40 has four ways (pairs) 40-1 to 40-4 which operate under the set associative method. Each way 40-1 to 40-4 has a pair composed of the data array 40a for holding data-to-be-accessed and the tag array 40b for holding tag information used to identify data held in the data array 40a, and the comparators 40c. The comparator 40c compares tag information held in the tag array 40b and a portion of an address received through the address input terminal 30A or 30B (i.e. access-data-specifying information which accompanies an access request received at the address input port 23A or 23B).

Lower bits (first bit string) of an address which is input to each way 40-1 to 40-4 from the address input terminal 30A or 30B via the crossbar switch 41 are provided to the data array 40a and the tag array 40b and used for specifying a specific entry while upper bits (second bit string) of the address are provided to the comparator 40c.

When data is held in the data array 40a, upper bits (second bit string) of an address for specifying the data are held as tag information in the tag array 40b at the same address as that (first bit string) of the data array 40a where the data is held.

Accordingly, by comparing, using the comparator 40c, upper bits of an address input as access-data-specifying information with tag information which is read from the tag array 40b based on lower bits of the address, it is determined whether or not target data corresponding to the address is held in the data array 40a.

That is, when upper bits of the address input as access-data-specifying information match tag information read from the tag array 40b, it is determined that the target data corresponding to the address is held in the data array 40a (judgment of hit). When the upper bits do not match the tag information, it is determined that the target data is not held in the data array 40a (judgment of mishit).

Each data array 40a contains mode bits in conjunction with data. The mode bits include a VALID bit, a DIRTY bit, and TIME bits. As previously described with reference to FIG. 20, the control unit 22 writes/updates these mode bits via the mode bit terminal 33.

During initialization, all the VALID bits are set to "0", thereby invalidating all entries in the corresponding data array 40a. The DIRTY bit is set to "1", in the case where data written into the data array 40a has not been written back to the main storage 15, and therefore the data must be written back into the main storage 15 when entries in the corresponding data array 40a are invalidated. TIME bits indicate time (last access time) when an access was last performed to data stored in the corresponding data array 40a, and is renewed by the control unit 22 each time an access is performed to the data array 40a.

The crossbar switch 41 selectively supplies a pair composed of the data array 40a and the tag array 40b of each of the ways 40-1 to 40-4 with each of the addresses (access-data-specifying information) which are input in conjunction with access requests into the cache mechanism 40 via the address input terminals 30A and 30B (address input ports 23A and 23B).

The crossbar switch 41 is composed of switching points 41A-1 to 41A-4 for supplying an address input via the address input terminal 30A to any of the ways 40-1 to 40-4 and switching points 41B-1 to 41B-4 for supplying an address input via the address input terminal 30B to any of the ways 40-1 to 40-4. The switching mechanism control unit 221 in the control unit 22 turns on/off each of the switching points 41A-1 to 41A-4 and 41B-1 to 41B-4, thereby controlling the state of switching of the crossbar switch 41.

The crossbar switch 42 selectively supplies the data array 40b of each of the ways 40-1 to 40-4 in the cache mechanism 40 with data which is input via the data input-output ports 24A and 24B or 27, and selectively outputs data held in the data array 40b of any one of the four ways 40-1 to 40-4 to the data input-output ports 24A and 24B or 27. The crossbar switch 42 outputs data from a source way to a destination way when the move instructing function 224 of the control unit 22 instructs movement of data stored in the cache mechanism 40.

The crossbar switch 42 is composed of switching points 42A-1 to 42A-4 for connecting the data input-output terminal 31A (data input-output port 24A or 27) and the data array 40a of each of the ways 40-1 to 40-4 and switching points 42B-1 to 42B-4 for connecting the data input-output terminal 31B (data input-output port 24B or 27) and the data array 40a of each of the ways 40-1 to 40-4. The switching mechanism control unit 221 in the control unit 22 turns on/off each of the switching points 42A-1 to 42A-4 and 42B-1 to 42B-4, thereby controlling the state of switching of the crossbar switch 42.

The crossbar switch 43 selectively outputs to the address output port 26 an address which is input via each of the address input terminals 30A and 30B and then supplied to each of the ways 40-1 to 40-4, or an address which is read from the tag array 40b within each of the ways 40-1 to 40-4.

The crossbar switch 43 is composed of switching points 43-1 to 43-4 for connecting an address line extending to each of the ways 40-1 to 40-4 or the tag array 40b of each of the ways 40-1 to 40-4 with the tag output terminal 32 (address output port 26). The switching mechanism control unit 221 in the control unit 22 turns on/off each of the switching points 43-1 to 43-4, thereby controlling the state of switching of the crossbar switch 43.

The above-described crossbar switch 43 functions to perform the following operations. When data is to be written back into the main storage 15 from the cache mechanism 40, a destination address of the write is output from the corresponding tag array 40b to the main storage 15 via the address output port 26. When an access has mishit data in the cache mechanism 40, in order to read data requested by the access from the main storage 15, an address which specifies the data is output to the main storage 15 via the address output port 26.

FIG. 22 does not show the connection between the mode bit terminal 33 and each data array 40a and between the control terminal 34 and each component (cache mechanism 40 and crossbar switches 41 to 43).

The operation of the thus-configured multi-access cache memory device 10 of the first embodiment (including control operations of the switching mechanism control unit 221 and the cache mechanism control unit 222 in the control unit 22) will now be described.

The control unit 22 receives various instructions from the processor 11 via the control-line input-output ports 25A and 25B.

For example, each time processes or threads are switched, the processor 11 determines a preferential way using a process No. or thread No. (identifier) and stores information regarding the preferential way in a register (not shown) in the processor 11 before performing an access to memory.

When a memory access is performed, a value which specifies the preferential way is read from the register and then sent to the control unit 22 via the control line input-output port 25A or 25B. Accordingly, the priority assigning function 223 of the control unit 22 can determine a preferential way for the access A or B. To avoid an increase in quantity of hardware, access A may be preferentially handled by way α (40-1), and access B may be preferentially handled by way γ (40-3). In the description below, the ways 40-1 to 40-4 may be represented by ways α, β, γ, and δ, respectively.

When a flow of data can be predicted to be at a compiling stage, it may be possible to fully determine the manner in which ways are divided into groups (subsets) in which access A received via the ports 23A, 24A, and 25A and access B received via the ports 23B, 24B, and 25B are performed. In such a case, ways α to δ are not dynamically divided as described below, but ways to be accessed are determined using static instructions issued via a control line.

By contrast, in some cases, it may be impossible to predict which way within the cache mechanism 40 contains required data. In such a case, information indicative of this situation is sent to the control unit 22 via a control line and the control line input-output port 25A or 25B. Then, the switching mechanism control unit 221 of the control unit 22 controls the state of switching of the crossbar switch 41 such that only a single access to the multi-access cache memory device 10 is allowed at each time (see FIG. 3).

As described above, the control unit 22 determines whether to determine a preferential way or whether to dynamically determine a way to be accessed.

Next will be described the operation of the multi-access cache memory device 10 of the present embodiment when a single access request is issued.

Suppose that an address which accompanies an access request (access A) is input to the address input port 23A. In this case, the switching mechanism control unit 221 turns on the switching points 41A-1, 41A-2, 41A-3, and 41A-4 of the crossbar switch 41, so that the address (access-data-specifying information) which accompanies access A is supplied to ways α, β, γ, and δ.

As described previously, in each of the ways α, β, γ, and δ, an access is performed to the corresponding data array 40a and tag array 40b based on the address supplied, and subsequently the comparator 40c compares corresponding tags. When the tags match, the corresponding entry must contain target data, but simultaneously, the VALID bit (a mode bit) of the corresponding data array 40a is also checked. Only when the VALID bit is "1," the entry is handled as valid. When any of ways α, β, γ, and δ satisfies this condition of match, it is considered that data is hit in the way.

When access A is a read, the switching mechanism control unit 221 turns on the corresponding switching point from among switching points 42A-1 to 42A-4 of the crossbar switch 42 so as to read data from the corresponding entry in the data array 40a. The read data is sent back to the processor 11 via the data input-output terminal 31A, the bidirectional switch 29A, and the data input-output port 24A. Simultaneously, the control unit 22 writes the current time as the last access time into the TIME bits among the mode bits of the corresponding data array 40a.

When access A is a write, the switching mechanism control unit 221 turns on the corresponding switching point from among the switching points 42A-1 to 42A-4 of the crossbar switch 42 so as to write into the corresponding entry data which is input from the processor 11 via the data input-output port 24A, the bidirectional switch 29A, and the data input-output terminal 31A. Simultaneously, as in the case of a read described above, the control unit 22 writes the current time as the last access time into the TIME bits among the mode bits of the corresponding data array 40a. Further, the DIRTY bit is set to "1" indicating that the content of the entry has been altered.

For example, when data is hit at an accessed address in way γ (40-3) within the cache mechanism 40, the switching point 42A-3 of the crossbar switch 42 is turned on so as to supply the data to the processor 11. When data is hit at an accessed address in way α (40-1) within the cache mechanism 40, the switching point 42B-1 of the crossbar switch 42 is turned on so as to supply the data to the processor 11.

When none of ways α to δ within the cache mechanism 40 satisfies the above-described condition of hit, it is considered that data has been mishit in the cache mechanism 40. When a judgment of mishit is formed on access A, in order to read data to be accessed by access A from the main storage 15 and to store the read data into the cache mechanism 40, first, the control unit 22 references mode bits VALID and TIME in the data array 40a of each of ways α to δ.

In this case, when a preferential way is not assigned, the control unit 22 references the VALID bit of each of the ways α to δ. If a way whose VALID bit is "0" is present, then the corresponding entry is free. Hence, it is determined that data read from the main storage 15 be stored into the entry. By contrast, when all the VALID bits are set to "1," ways α to δ are compared with respectto TIME (last access time). A way having the oldest TIME is determined to be a destination of data storage. When a preferential way is assigned, the control unit 22 references the VALID bit of the preferential way. If the VALID bit is "0," then it is determined that data read from the main storage 15 be stored in the corresponding entry (see FIGS. 7 and 8). If the VALID bit of the preferential way is "1" and there exists another way whose VALID bit is "0," then it is determined that data be stored in the corresponding entry of a way whose VALID bit is "0" (see FIGS. 9 and 10). If all the VALID bits are set to "1," then it is determined that data be stored in a way having the oldest TIME (see FIGS. 13 and 14). In cases other than the above-described cases, it is determined that data be stored in the preferential way (see FIGS. 11 and 12).

When a way into which data read from the main storage 15 is stored is determined as described above, the control unit 22 references the VALID bit and the DIRTY bit in the entry of the way. If both bits are set to "1," then the control unit 22 sends to the main storage 15 a write-back address (tag information held in the corresponding tag array 40b) via the crossbar switch 43 and the tag output terminal 32 in order to write data held in the entry back into the main storage 15.

Subsequently, when access A is a read, a read address is sent to the main storage 15 to read data therefrom. The thus read data is stored into the data array 40a of the way determined to be a destination of storage. Further, the VALID bit is set to "1" and the DIRTY bit is set to "0." Upper bits (second bit string) of the address of access to the main storage 15 are written into the corresponding tag array 40b as tag information. The data stored in the data array 40a is also sent to the processor 11.

When access A is a write, data-to-be-written transmitted from the processor 11 is stored into the data array 40a of the way determined to be a destination of storage at a required address. Further, the VALID bit is set to "1" and the DIRTY bit is set to "1." Also, in this case, upper bits (second bit string) of the address of access to the main storage 15 are written into the corresponding tag array 40b as tag information.

In the case of a mishit, during the time between determination of a way into which data read from the main storage 15 is stored and completion of an access, only the way determined to be a destination of storage is in use. It must be noted that other ways are available for use.

Figure 23:
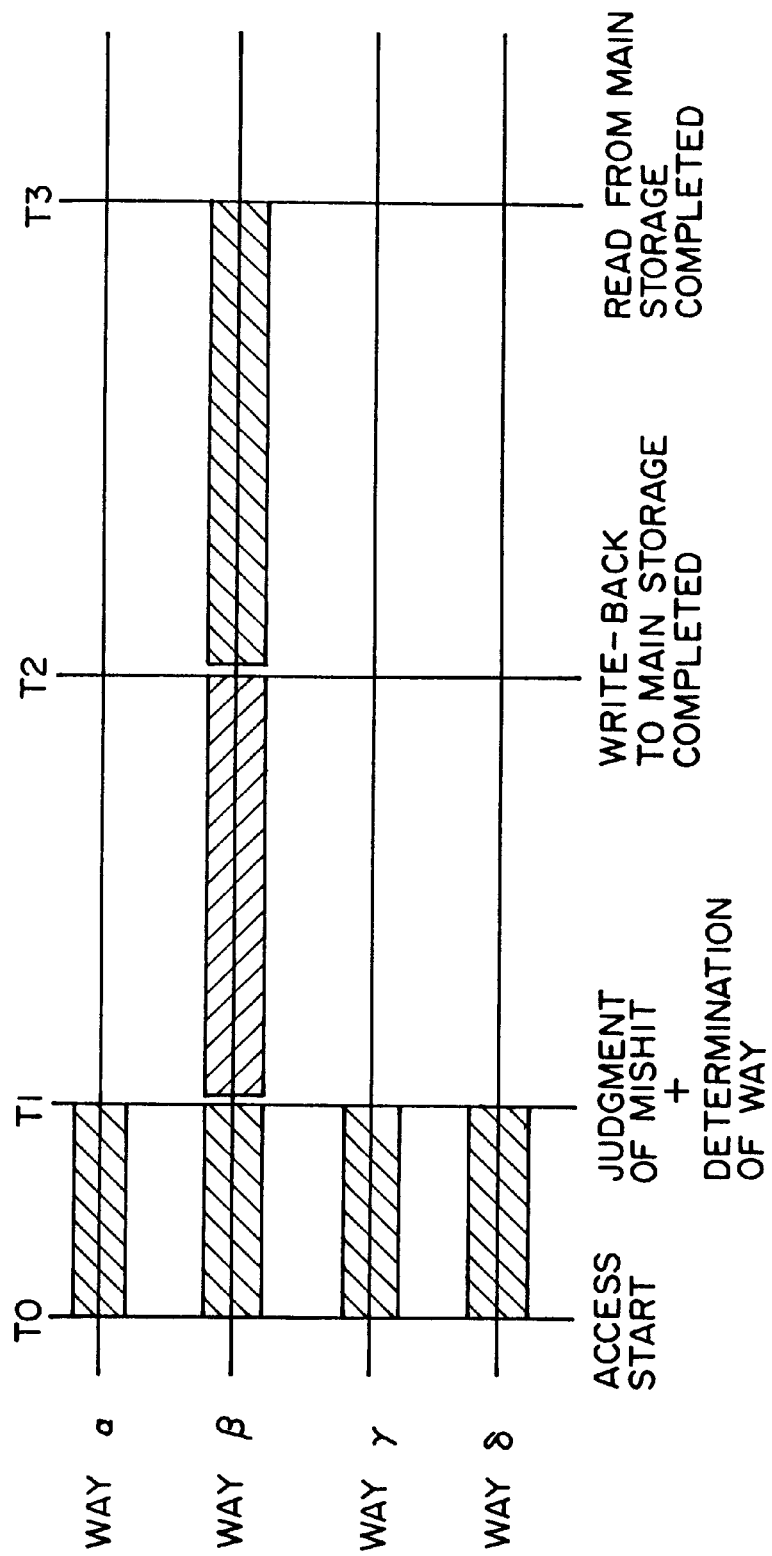
FIG. 23 is a timing chart for explaining the operation of the first embodiment.

For example, as shown in FIG. 23, suppose that after a single read access A has been performed using all ways α to δ (period from T0 to T1), a judgment of mishit is made with respect to access A and that way β is determined to be a destination of storage and mode bits of way β are set such that VALID=1 and DIRTY=1. In this case, ways other than way β, i.e., ways α, γ, and δ are unused during the period from T1 to T2 when data in the corresponding entry is written back into the main storage 15 and period from T2 to T3 when data to be accessed is read from the main storage 15.

In the present embodiment, the unused ways α, γ, and δ can receive another access. If another single access B is received during the period from T1 to T2 and period from T2 to T3, the unused ways α, γ, and δ are used. When any of these ways α, γ, δ has a valid entry for access B, access B can be handled as data being hit therefor. When a valid entry is not present for access B, an access to way β is performed at the time when the execution of the previous access A ends and way β is released. Subsequently, when a valid entry for access B is present in way β, access B is handed as data being hit therefor. However, when way β does not have a valid entry for access B, the above-described processing to handle a mishit is performed.

Next will be described the operation when two access A and B are concurrently received via the ports 23A, 24A, and 25A and the ports 23B, 24B, and 25B, respectively.

When either one of accesses A and B is not assigned a preferential way, accesses A and B are performed one after another while one access is made to stand by. This operation is identical to that of the above-described case of a single access.

Also, when both accesses A and B are assigned the same preferential way, accesses A and B are performed one after another while one access is made to stand by.

Even when accesses A and B are assigned different preferential ways, they are handled in different ways depending on conditions. When either of the preferential ways is the same way as that currently being used, for example, during the above-described mishit period, the corresponding access is made to stand by. Otherwise, accesses A and B are performed concurrently.

Various methods are conceivable for assigning ways α to δ to accesses A and B. An example of the assignment is shown in FIG. 24. That is, FIG. 24 shows preferential ways (α to δ) which are previously assigned to accesses A and B, and an access (A or B) which is actually performed in each way α to δ in accordance with the predetermined priority assigned to the ways. However, an access is not performed to a way in use.

When valid data is found in an entry of one of ways α to δ at an initial access, the access is handled as data being hit therefor. If valid data is not found, another way is accessed.

When the initial access and an access to any of the remaining ways collide, the initial access is preferentially processed.

In order to improve a hit ratio of an initial access, the present embodiment allows data to move from one way to another within the cache mechanism 40 using the move instructing function 224 of the control unit 22 as described before with reference to FIG. 20.

When the processor 11 performs an access accompanied by an instruction of move via a control line, the move instructing function 224 of the control unit 22 performs, for example, the below-described operations ① to ③.

① When target data exists in a way other than a way specified as a destination of move, data is transferred from the other way to the destination way, and the corresponding entry of the other way is invalidated. When the destination way is valid and DIRTY, data contained therein is written back into the main storage 15, and then data is transferred to the destination way.

② When target data exists in a way specified as a destination of move, no particular operation is performed.

③ When target data is mishit, data is stored in a way specified as a destination of move. When the destination way is valid and DIRTY, data contained therein is written back into the main storage 15, and subsequently data is fetched from the main storage 15 and then written into the destination way.

Operations of the move instructing function 224 are not to be limited to those described above in ① to ③. Various other operations are conceivable.

According to another way of improving a hit ratio of an initial access, an area is determined based on an accessed address. This method assigns a preferential way to each area. That is, a value is written into a register (upper-limit pointer) indicative of an upper limit of an area, and a value is written into a register (lower-limit pointer) indicative of a lower limit of the area. An accessed address is compared with the contents of the registers. When the comparison reveals that the accessed address exists between the upper and lower limits, a preferential way is determined (see FIG. 18).

As described above, according to the first embodiment of the present invention, a set of ways α to δ within the cache mechanism 40 are divided into non-overlapping groups. A single access is performed to ways belonging to one of the groups, thereby different accesses are performed to corresponding groups concurrently or in parallel. Thus, the duration of an access can overlap with that of another access.

Accordingly, as compared with a conventional cache memory device which handles a single access under a set associative method, the present invention allows multi-access while an increase in quantity of hardware is suppressed and processing is speeded up. Particularly, the invention is applicable to a cache memory for a high-performance parallel-processing architecture including a few processors having a common cluster.

The present invention is promisingly usable as a built-in cache memory of a superscalar type processor having a plurality of load/store units and of a VLIW (Very Long Instruction Word) type processor. Further, it is greatly advantageous to perform thread switching utilizing a multi-thread architecture, thereby concealing latency due to mishit in a cache memory.

Further, when there exists only a single access request, the access is performed to all ways α to δ, thereby enabling processing similar to a conventional one. Also, after a judgment of mishit is made on group basis, an access is continuously performed to ways other than that where data was mishit, thereby reducing a traffic ratio. An access may be issued to other ways before a judgment of mishit is made with respect to a certain way, thereby further speeding up processing.

When a judgment of mishit is made with respect to the cache mechanism 40, data read from the main storage 15 is written into one of ways α to δ which is found to contain the oldest data by referring to the TIME bits within the mode bits, thereby retaining newer data having a higher potential of being accessed.

Also, an access, for write/read, to ways α to δ within the cache mechanism 40 is performed in accordance with data storage priority which was assigned to each of the ways, thereby significantly improving a hit ratio at an initial access and speeding up multi-access to the cache mechanism 40.

In this case, by moving data stored in a certain way to another way which is assigned a higher data storage priority with respect to a process, thread or the like having a higher potential of accessing the data, a hit ratio at an initial access can be further improved, thereby further speeding up multi-access.

In the above-described first embodiment, the cache mechanism 40 operates under a 4-way set associative method and thus can concurrently receive up to two accesses. However, the present invention is not to be limited thereto.

The above-described first embodiment is used in a system having only one processor. However, the present invention is not to be limited thereto. A plurality of processors may share the multi-access cache memory device 10. In this case, information (processor No. or processor identifier) which specifies each processor may be used as an element (access requester information) for determining a preferential way.

(C) Second Embodiment

Figure 25:
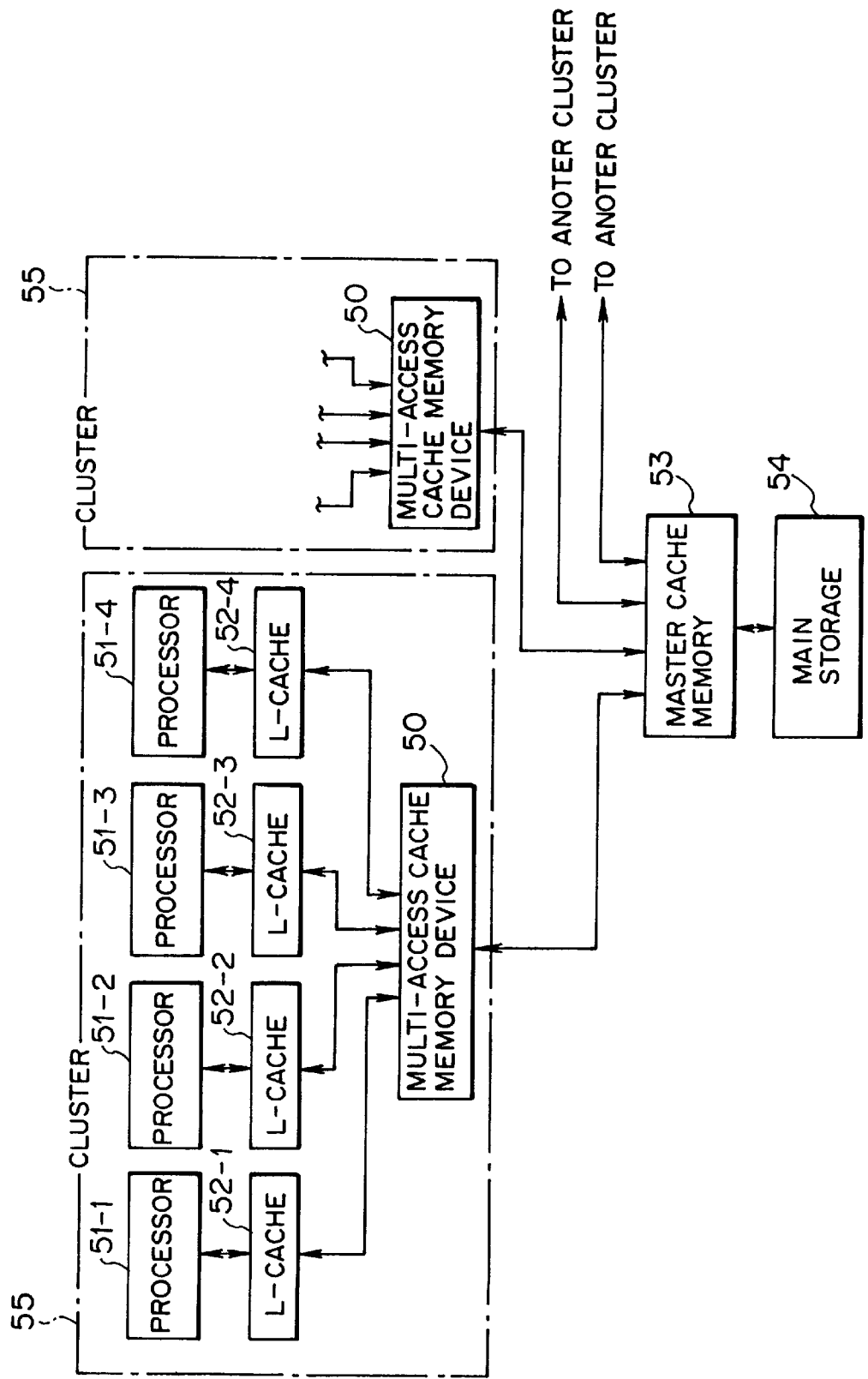
FIG. 25 is a block diagram showing the overall configuration of a system to which a second embodiment of the present invention is applied.

FIG. 25 is a block diagram showing the overall configuration of a system using a second embodiment of the present invention. As shown in FIG. 25, a multi-access cache memory device 50 according to the second embodiment is interposed between a local cache memory (hereinafter referred to as L-cache) 52-1 to 52-4 provided for each of processors 51-1 to 51-4 and a master cache memory 53.

In the system shown in FIG. 25, a plurality of clusters 55 are provided which share the master cache memory 53 and a main storage 54, and each cluster 55 is adapted to access data contained in the main storage 54 via the master cache memory 53.

As described above, each cluster 55 is composed, for example, of four processors 51-1 to 51-4, L-caches 52-1 to 52-4 corresponding to the processors 51-1 to 51-4, and the multi-access cache memory device 50 which is shared by the processors 51-1 to 51-4 via the L-caches 52-1 to 52-4. Each processor 51-1 to 51-4 can access data contained in the master cache memory 53 and the main storage 54 via the corresponding L-cache 52-1 to 52-4 and the multi-access cache memory device 50.

Each L-cache 52-1 to 52-4 operates under a write through method. When each of the processors 51-1 to 51-4 performs a write to each of the L-caches 52-1 to 52-4, the write is reflected on data held in the multi-access cache memory device 50.

Here, in addition to an address, a space identifier is used as information which specifies data-to-be-accessed. A dynamic address translation is performed using a space identifier and an address. The dynamic address translation translates a virtual address into a real address. Each of the L-caches 52-1 to 52-4 is a virtual address cache memory and caches data including a space identifier. The multi-access cache memory device 50 according to the present embodiment is a real address cache memory and has a mechanism 80*d* (DAT: Dynamic Address Translator) for performing a dynamic address translation.

In order to share data among caches while consistency of data is maintained, a write-once method, a synapse method, or a like method may be employed. In order to avoid complex control, the present embodiment does not allow caches to share data. That is, the present embodiment has mode bits such as a VALID bit, a DIRTY bit, etc. as the first embodiment does.

When data is mishit within the multi-access cache memory device 50, the multi-access cache memory device 50 notifies the master cache memory (storage device) 53 of the address of the data which was mishit. When an entry corresponding to the address exists in the master cache memory 53, the master cache memory 53 returns the content of the entry to the multi-access cache memory device 50. The master cache memory 53 also notifies the address to the multi-access cache memory device 50 belonging to another cluster 55.

When an entry corresponding to the address of the data which was mishit exists in another multi-access cache memory device 50, the content of the entry is transferred to the multi-access cache memory device 50 where a mishit occurred. The content of an entry transferred has preference over that returned by the master cache memory 53. Also, the processing of invalidating the entry is performed to invalidate the corresponding entry in the L-caches 52-1 to 52-4.

When no valid entry exists in none of the master cache memory 53 and other multi-access cache memory devices 50, the master cache memory 53 judges data as being mishit and hence accesses the main storage 54 for the data mishit.

Figure 26:
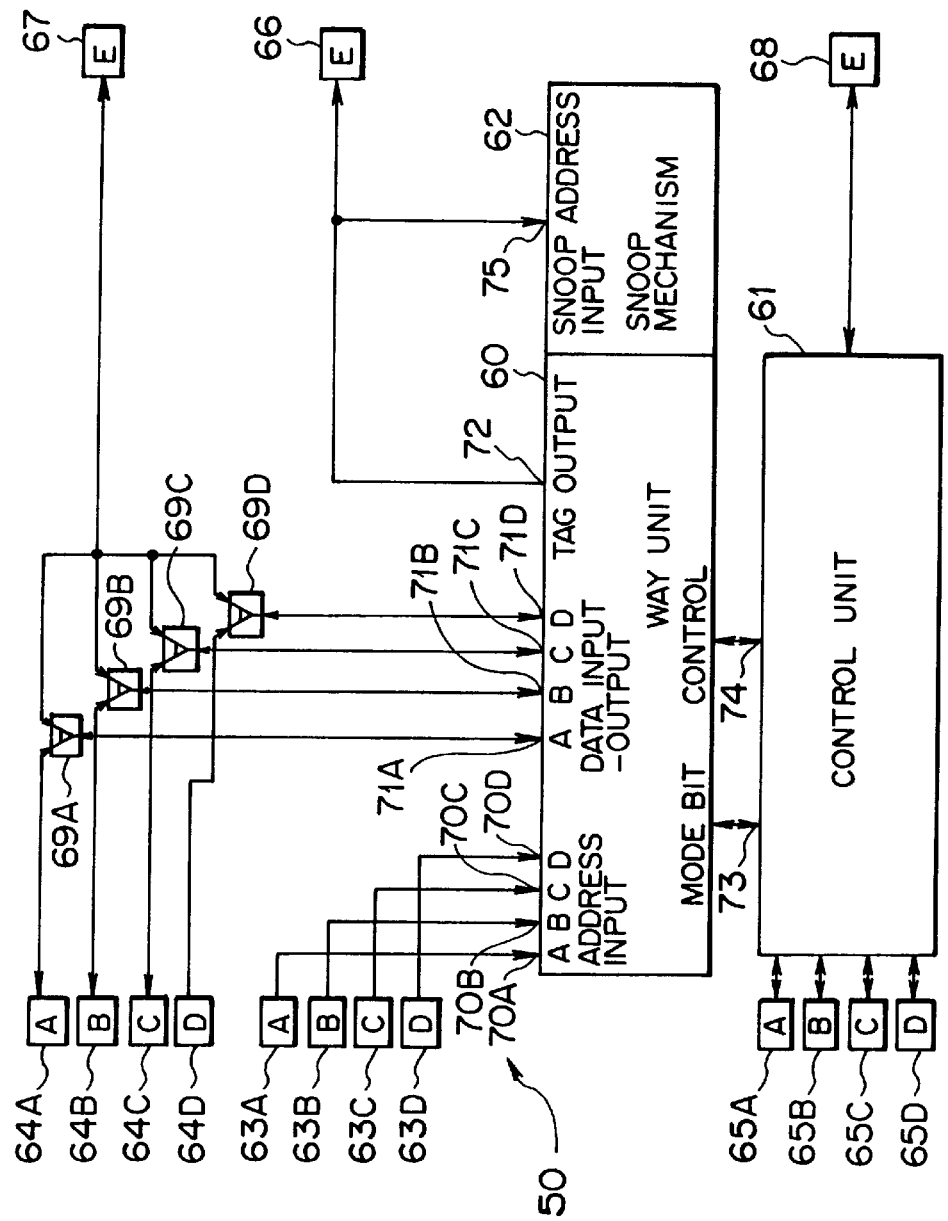
FIG. 26 is a block diagram showing the overall configuration of a multi-access cache memory device according to the second embodiment of the present invention.
Figure 27:
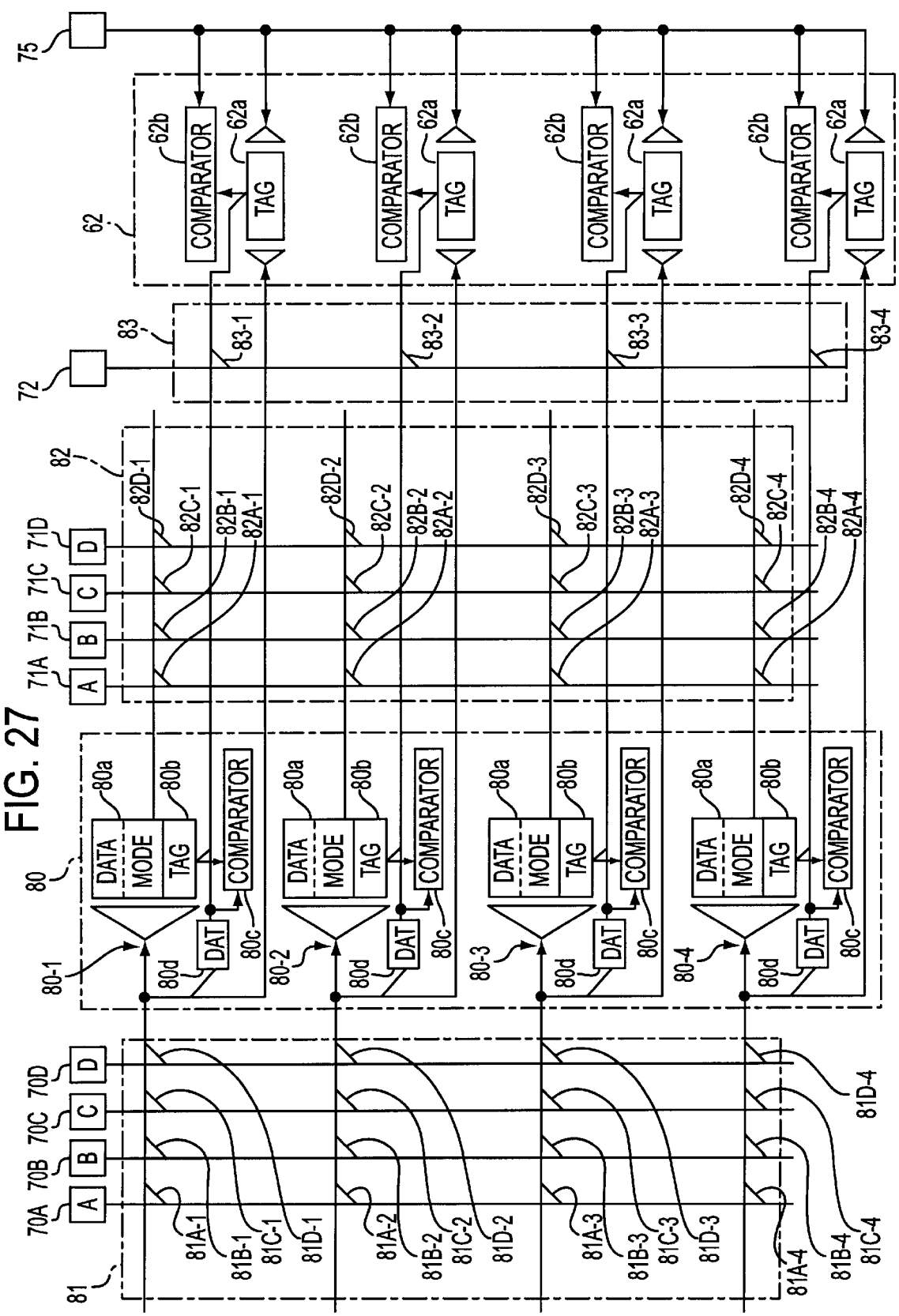
FIG. 27 is a block diagram showing the configuration of a way unit (cache mechanism, switching mechanism, and snoop mechanism) in the second embodiment.

As shown in FIGS. 26 and 27, the multi-access cache memory device 50 according to the second embodiment has a snoop mechanism 62 for detecting an entry corresponding to the above-described address notified.

FIG. 26 is a block diagram showing the overall configuration of the multi-access cache memory device 50 according to the second embodiment of the present invention. As shown in FIG. 26, the multi-access cache memory device 50 according to the second embodiment has substantially the same structure as that of the multi-access cache memory device according to the first embodiment except that the second embodiment can receive up to four access requests and has the snoop mechanism 62.

The multi-access cache memory device 50 is composed of a way unit 60 including a set of ways 80-1 to 80-4 as shown in detail in FIG. 27, a control unit 61 having a function of controlling the snoop mechanism 62 in addition to similar functions to those of the control unit 22 of the first embodiment, and the snoop mechanism 62 having a function to be described later. The multi-access cache memory device 50 is further composed of address input ports 63A to 63D, data input-output ports 64A to 64D, control line input-output ports 65A to 65D, an address input-output port 66, a data input-output port 67, and a control line input-output port 68.

The address input ports 63A to 63D, the data input-output ports 64A to 64D, and the control line input-output ports 65A to 65D are connected to the processors 51-1 to 51-4 shown in FIG. 25 via the L-caches 52-1 to 52-4 to receive an access to the cache memory device 50 issued by each of the processors 51-1 to 51-4. These ports are provided in fours so as to concurrently receive four accesses.

The address input-output port 66, the data input-output port 67, and the control line input-output port 68 are connected to the master cache memory 53 (corresponding to the main storage 15 of the first embodiment) shown in FIG. 25 so as to access the master cache memory 53. In FIG. 26, ports connected to the master cache memory 53 are assigned symbol "E".

The way unit 60 is provided with address input terminals 70A to 70D, data input-output terminals 71A to 71D, a tag output terminal 72, a mode bit terminal 73, a control terminal 74, and a snoop address input terminal 75.

The address input terminals 70A to 70D are directly connected to the address input ports 63A to 63D, and the tag output terminal 72 and the snoop address input terminal 75 are directly connected to the address input-output port 66.

The tag output terminal 72 functions in the same manner as the tag output terminal 32 of the first embodiment does, and also outputs an address for performing a judgment of hit/mishit on ways not belonging to an accessed subset. The data input-output terminals 71A to 71D are connected to the data input-output ports 64A to 64D, respectively, and to the data input-output port 67, via bidirectional switches 69A to 69D, respectively, having the same structure as that shown in FIG. 21.

The snoop address input terminal 75 is used to input into the snoop mechanism 62 an address transmitted from the address input-output port 66 or an address transmitted from the tag output terminal 72.

The control line input-output ports 65A to 65D and 68, the mode bit terminal 73, and the control terminal 74 are connected to the control unit 61. The control unit 61 has a function of controlling the state of the way unit 60 and the snoop mechanism 62 by transmitting various control signals to and from the way unit 60 via the control terminal 74 and a function of writing mode bit information (VALID, DIRTY, TIME, etc.) into the data array 80*a* of each of ways 80-1 to 80-4 via the mode bit terminal 73 and reading mode bit information from the data array 80*a* via the mode bit terminal 83 as in the first embodiment.

Except for a function of controlling the snoop mechanism 62, the control unit 61 basically has similar functions to those of the first embodiment, i.e. a function serving as the previously described switching mechanism control unit 221 and the cache mechanism control unit 222, and the priority assigning function 223 and the move instructing function 224.

As shown in FIG. 27, the way unit 60 of the second embodiment is composed of a cache mechanism 80 and crossbar switches (switching mechanism) 81 to 83, thus having substantially the same structure as that of the way unit 21 of the first embodiment.

The cache mechanism 80 has four ways (pairs) 80-1 to 80-4 which operate under a set associative method. Each way 80-1 to 80-4 is provided with a pair composed of the data array 80*a* and the tag array 80*b*, a comparator 80*c* which functions like the comparator 40*c* of the first embodiment, and the dynamic address convertor (hereinafter abbreviated as DAT) 80*d* for performing a dynamic address translation described previously.

A function implemented by the data array 80*a*, the tag array 80*b*, and the comparator 80*c* of the second embodiment is substantially similar to that implemented by the data array 40*a*, the tag array 40*b*, and the comparator 40*c* of the first embodiment, and hence is not described in detail herein. The major difference between the functions is described below. The tag array 80*b* of the second embodiment contains the upper bits of an address input which have been translated by DAT 80*d*. The comparator 80*c* of the second embodiment compares the upper bits of an address input which have been translated by DAT 80*d* with tag information read from the tag array 80*b*.

The crossbar switch 81 selectively supplies a pair composed of the data array 80*a* and the tag array 80*b* of each of the ways 80-1 to 80-4 with each of the addresses and space identifiers (access-data-specifying information) which are input in conjunction with access requests into the cache mechanism 80 via the address input terminals 70A to 70D (address input ports 63A to 63D).

The crossbar switch 81 is composed of switching points 81A-1 to 81A-4 for supplying an address (including a space identifier) input via the address input terminal 70A to any of the ways 80-1 to 80-4, switching points 81B-1 to 81B-4 for supplying an address input via the address input terminal 70B to any of the ways 80-1 to 80-4, switching points 81C-1 to 81C-4 for supplying an address input via the address input terminal 70C to any of the ways 80-1 to 80-4, and switching points 81D-1 to 81D-4 for supplying an address input via the address input terminal 70D to any of the ways 80-1 to 80-4. The control unit 61 turns on/off each of the switching points 81A-1 to 81A-4, 81B-1 to 81B-4, 81C-1 to 81C-4, and 81D-1 to 81D-4, thereby controlling the state of switching of the crossbar switch 81.

The crossbar switch 82 selectively supplies the data array 80*a* of each of the ways 80-1 to 80-4 in the cache mechanism 80 with data which is input via the data input-output ports 64A–64D or 67, and selectively outputs data held in the data array 80*a* of any one of the four ways 80-1 to 80-4 to the data input-output ports 64A, 64B or 67.

The crossbar switch 82, structured substantially similar to the crossbar switch 81, is composed of switching points 82A-1 to 82A-4, 82B-1 to 82B-4, 82C-1 to 82C-4, and 82D-1 to 82D-4. The control unit 61 turns on/off each of the switching points 82A-1 to 82A-4, 82B-1 to 82B-4, 82C-1 to 82C-4, and 82D-1 to 82D-4, thereby controlling the state of switching of the crossbar switch 82.

The crossbar switch 83 selectively outputs to the address output port 66 or the snoop address input terminal 75 a lower address which is input via each of the address input terminals 70A to 70D and then supplied to each of the ways 80-1 to 80-4 and an upper address translated by DAT 80*d*, or an address which is read from the tag array 80*b* within each of the ways 80-1 to 80-4.

The crossbar switch 83 is composed of switching points 83-1 to 83-4 for selecting the connection between a lower-address line extending to each of the ways 80-1 to 80-4 and an upper-address line extending from each of DATs 80*d* and the tag output terminal 72 or the connection between the tag array 80*b* of each of the ways 80-1 to 80-4 and the tag output terminal 72. The control unit 61 turns on/off each of the switching points 83-1 to 83-4, thereby controlling the state of switching of the crossbar switch 83.

The snoop mechanism 62, which is a newly added mechanism in the second embodiment, is composed of duplicate tag arrays 62*a* and comparators 62*b* corresponding to the ways 80-1 to 80-4.

Each duplicate tag array 62*a* holds tag information (duplicate) identical to that which is input via each of the address input terminals 70A to 70D and stored in each tag array 80*b*. When tag information is stored into each of the tag arrays 80*b*, the upper bits of the corresponding address which are translated by DAT 80*d* are written as tag information into an entry specified by the lower bits of the address. When a snooping operation is performed or a judgment of hit/mishit is made with respect to a way not belonging to an accessed subset, each duplicate tag array 62*a* outputs to the comparator 62*b* tag information specified by part (lower bits) of an address input via the snoop address input terminal 75.

When a judgment of hit/mishit is made with respect to a way not belonging to an accessed subset, each comparator 62*b*, which shares DAT 80*d* belonging to a way to be accessed with the corresponding comparator 80*c*. The upper bits of a specified address of an access having proved to be a mishit are translated by DAT 80*d*. The result of the translation is transferred via the crossbar switch 83, the tag output terminal 72 and the snoop address input terminal 75 so as to be compared with the tag information obtained from the corresponding duplicate tag array 62*a*.

The function of the snoop mechanism 62 of the present embodiment will now be described. The snoop mechanism 62 is adapted primarily to determine (snooping operation) whether or not another multi-access cache memory device 50 contains an entry corresponding to a mishit address of the multi-access cache memory device 50, which mishit address is originally notified by the master cache memory 53. In addition, the snoop mechanism 62 operates (a snooping operation is preferentially performed) when upon performing an access to each of division groups in accordance with each of access requests, the division group proves not to contain data-to-be-accessed, i.e. when an initial access and a subsequent access prove to be a mishit.

That is, the snoop mechanism 62 receives an address (including a space identifier) of mishit data, which address has been translated by DAT 80*d*, and supplies the translated address to the comparator 62*b* belonging to a way other than that where a mishit occurred. The comparator 62*b* compares tag information held in the corresponding duplicate tag array 62*a* and the supplied upper bits of the address, thereby determining whether or not there exists a way holding the mishit data-to-be-accessed.

The snoop mechanism 62 identifies a way, if present, which contains data-to-be-accessed. The result of comparison by each of the comparators 62*b* within the snoop mechanism 62 and an identified way, if any, are transferred to the control unit 61 via a signal line (not shown) or the like. Based on the information transferred from the snoop mechanism 62, the control unit 61 controls a read/write of data from/to the cache mechanism 80.

FIG. 27 does not show the connection between the mode bit terminal 73 and each data array 80*a* and between the control terminal 74 and each component (cache mechanism 80, crossbar switches 81 to 83, and snoop mechanism 62).

Figure 28:
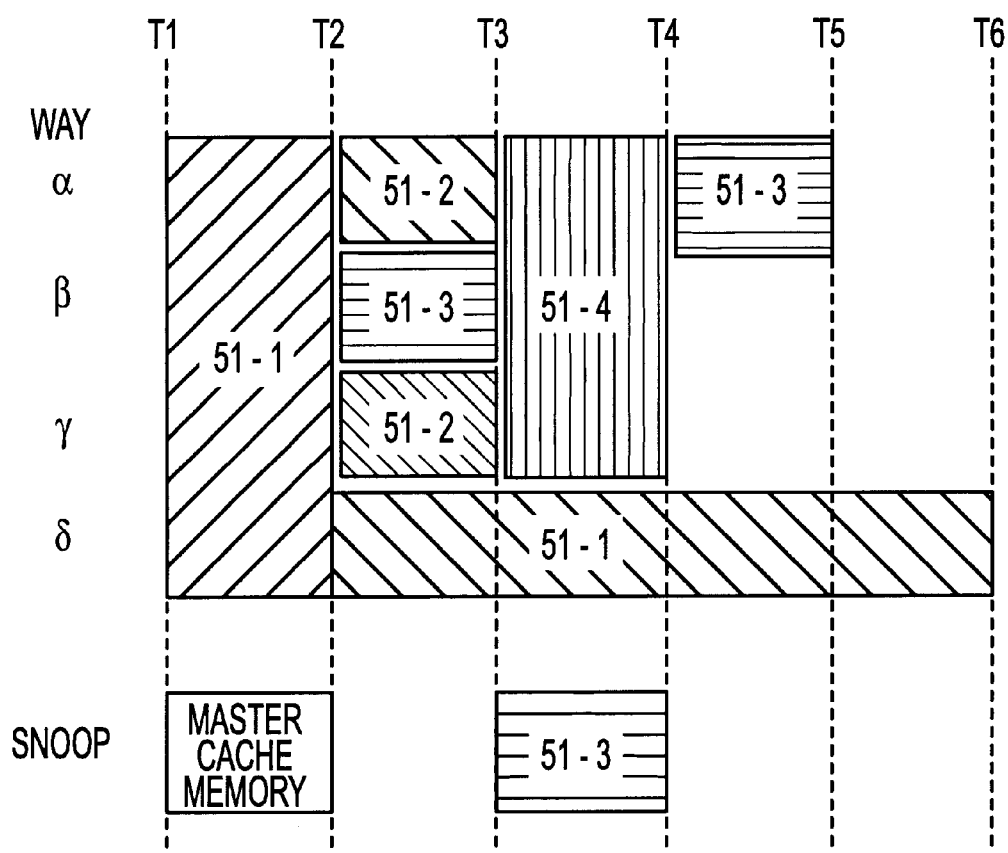
FIG. 28 is a timing chart for explaining the operation of the second embodiment.

The operation of the multi-access cache memory device 50 of the second embodiment having the above-described structure will now be described with reference to FIG. 28.

Suppose that the processor 51-1 has issued an access for write at time T1. In this case, because of a single access, the access is performed using all ways α to δ as described in the first embodiment. Also, suppose that the access (during period from T1 to T2) has proved to be a mishit, resulting in selection of way δ as a way for storage. To make description simple, suppose that the relevant entry in way δ is free (VALID=0).

In this case, a multi-access cache memory device 50 notifies a mishit address to the master cache memory 53, which, in turn, must notify the mishit address to other multi-access cache memory devices 50. After all the multi-access cache memory devices 50 in a system respond, the write to the entry within way δ can be ended. Way δ is not available for use until the write is completed (up to time T6).

When a relevant entry is present in another multi-access cache memory device 50, it is performed to invalidate the relevant entry in the multi-access cache memory device 50 and each of the L-caches 52-1 to 52-4 because it is not allowed to share data among caches as previously described.

Figure 31:
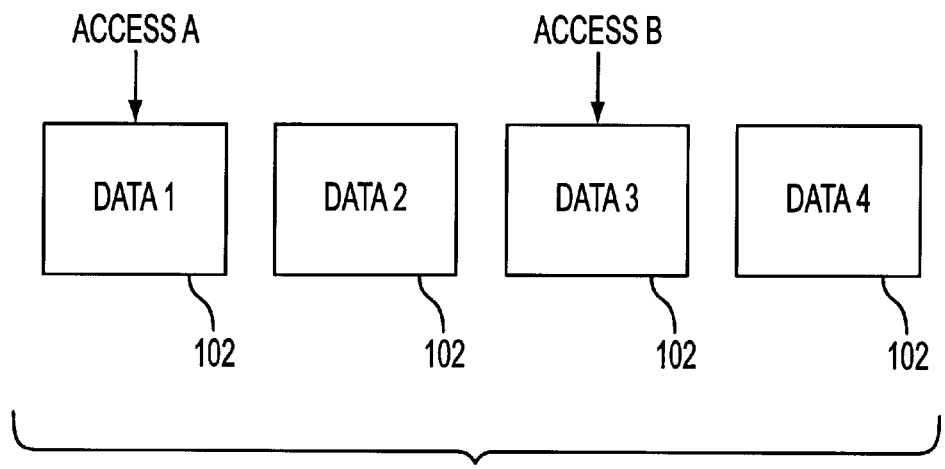
FIG. 31 is a diagram showing a data array of the conventional cache memory device for implementing multi-access.

In order to avoid redundantly accessing the same data, when another access request having the same lower address as that of the initial access request is issued during a period extending up to time T6, the new access request is postponed to a point of time behind time T6. As shown in FIG. 31, suppose that at time T1, a snoop request is issued from the master cache memory 53 and a relevant entry is not present. When the relevant entry is present, processing is performed to invalidate entries in the multi-access cache memory device 50 and the L-caches 52-1 to 52-4.

Suppose that at time T2, an access is issued from each of the processors 51-2 and 51-3 and that the accesses are assigned preferential ways α and β, respectively. Also suppose that the processor 51-2 accesses ways α and γ and the processor 51-3 accesses way β.

Suppose that at time T3, the processor 51-4 issues an access which is not assigned a preferential way. As described in the first embodiment, available ways are all assigned to these accesses. Thus, no way is available for an access from the processor 51-3 which is in the state of mishit (an initial access has preference).

In this case, the access from the processor 51-3 is transferred to the snoop mechanism 62 to identify a-way which holds data required by the processor 51-3.

During the period from time T3 to Time T4, an access from the processor 51-4 hits data in way γ and then ends, and it is found by the snoop mechanism 62 that data to be accessed by the processor 51-3 is present in way α.

Then, during the period from time T4 to time T5, the processor 51-3 accesses way α and hits data therein without fail, and thus the access ends.

When a request for determination of a way using the snoop mechanism 62 and a request for snoop from the master cache memory 53 occur concurrently, the request for snoop from the master cache memory 53 has preference over the other request. Thus, a way is not determined.

Figure 29:
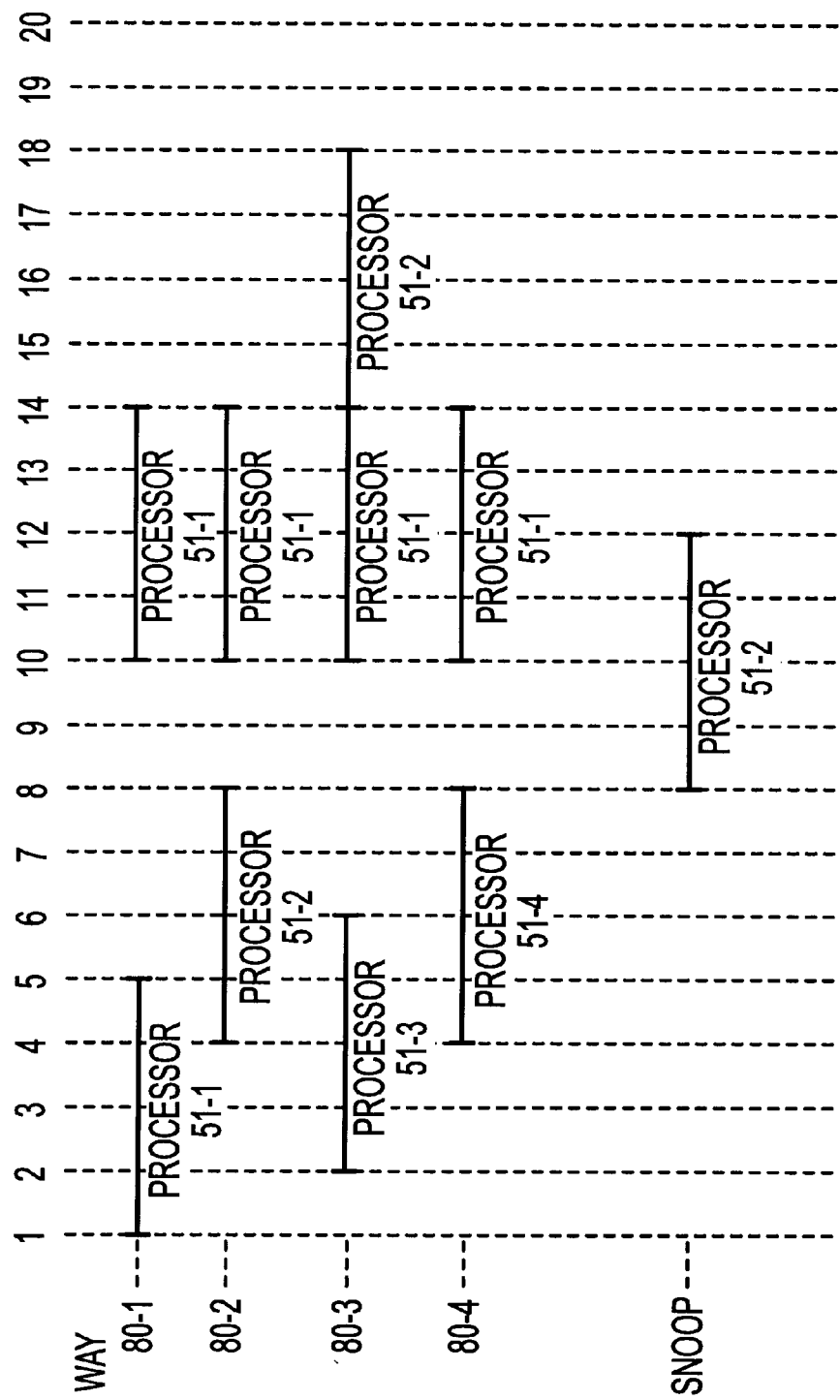
FIG. 29 is a timing chart for explaining the operation of the second embodiment.
Figure 30A:
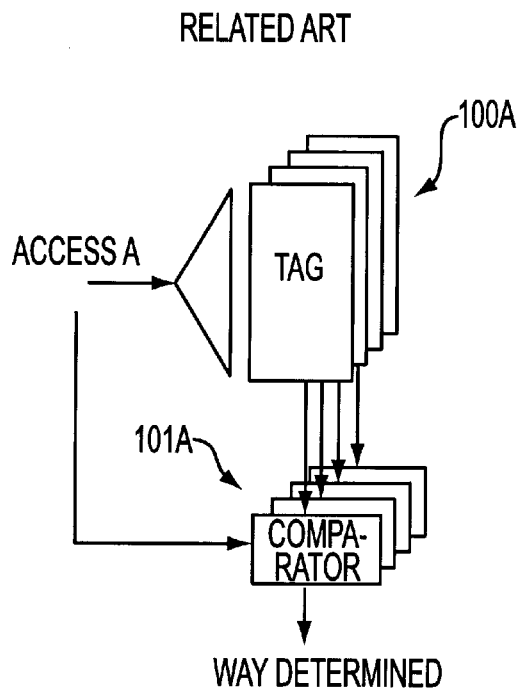
FIGS. 30(a) and 30(b) are diagrams showing a tag array (address array) of a conventional cache memory device for implementing multi-access.
Figure 30B:
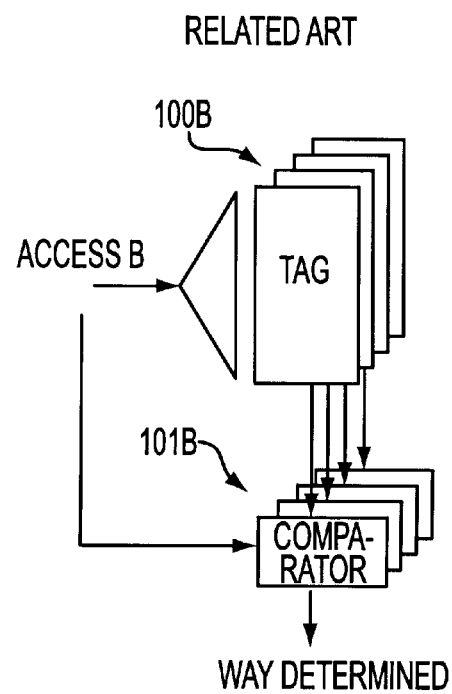

Next will be described with reference to FIG. 29 another operation of the multi-access cache memory device 50 of the second embodiment having the above-described structure. In FIG. 29, values appearing at the top portion thereof indicate cycle numbers.

To make description simple, as shown in FIG. 29, preferential ways 80-1 to 80-4 are assigned to processors 51-1 to 51-4, respectively, which access the multi-access cache memory device 50.

Suppose that in distinction from the first embodiment, when either a single access or a plurality of accesses are requested, each access is performed using a single way unless otherwise specified.

This operation of the second embodiment is advantageous when time corresponding to steps of a pipeline is shorter than an access time of an access to each of the ways 80-1 to 80-4. Here, suppose that an access time of an access to each of the ways 80-1 to 80-4 corresponds to four steps of a pipeline.

In this another operation of the second embodiment, when a preferential way is specified, any of the following operations ① to ③ is performed unless otherwise specified.

① An access is performed only to a preferential way (the access is delayed if the way is not available for use).

② When a mishit occurs, a way is determined using the snoop mechanism 62.

③ When the snoop mechanism 62 is occupied by another access, an access is delayed until the snoop mechanism 62 becomes available for use.

④ When a way is determined, the way is accessed as soon as it becomes available for use.

This another operation of the second embodiment is not limited to the above-described set of operations, but various variations may be applied. For example, regarding operation ③, another way may be accessed.

By performing the above-described operations, a traffic rate of a way is reduced, thereby facilitating multi-access.

In FIG. 29, since an access from the processor 51-1 occurs in the first cycle, the way 80-1 is used. In the second cycle, because of an access from the processor 51-3, the way 80-3 is used. Further, in the fourth cycle, because of an access from each of the processors 51-2 and 51-4, the ways 51-2 and 51-4 are used.

Since an access from each of the processors 51-1, 51-3, and 51-4 has hit data in the ways 80-1, 80-3, and 80-4, respectively, within the cache mechanism 80, the accesses end in the fifth, sixth, and eighth cycles, respectively.

By contrast, since the processor 51-2 has failed to find out a valid entry in the way 80-2 within the cache mechanism 80, it starts checking from the eighth cycle using the snoop mechanism 62 whether or not ways 80-1, 80-3, and 80-4 other than the way 80-2 contain a valid entry.

In the tenth cycle where checking by means of the snoop mechanism 62 is not completed, the processor 51-1 issues an access and an instruction via a control line to use as many ways as possible for the access. Thus, the access is performed to all the ways 80-1 to 80-4.

In the twelfth cycle, the snoop mechanism 62 identifies the way 80-3 as having an entry which contains required data to be accessed by the processor 51-2. However, in the twelfth cycle, since the way 80-3 is occupied by the processor 51-1 as described above, the access to the way 80-3 is postponed to the fourteenth cycle.

Thus, the second embodiment of the present invention provides not only the similar action and effect to that of the first embodiment described previously but also the below-described snooping feature. The snoop mechanism 62 is provided which has a plurality of duplicate tag arrays 62a, each containing the same content as that of each of the tag arrays 80b. When data is mishit at an initial access, the duplicate tag arrays 62a within the snoop mechanism 62 are searched for a way which contains a target entry of the access. When such a way is present, it is identified. This snooping operation can be performed in parallel with an ordinary access. Accordingly, multi-access can be further speeded up.

According to the above-described another operation of the second embodiment, the cache mechanism 40 operates under a 4-way set associative method, thereby concurrently receiving up to four accesses. However, the present invention is not limited thereto.

Also, according to the above-described second embodiment, a preferential way is assigned to each of the processors 51-1 to 51-4. However, a method of assigning preferential ways is not limited to this. A preferential way may be assigned based on a thread No., a process No., an address, etc., as described in the first embodiment.

What is claimed is:

1. A multi-access method for a storage level including a plurality of pairs, each comprising a data array which holds data to be accessed and a tag array which holds tag information for specifying data held in the data array, the method comprising the steps of:

when a plurality of access requests are received, dividing the plurality of pairs into a plurality of subsets based on predetermined information indicating preferred pairs for respectively corresponding access requests, the plurality of subsets being selected to be non-overlapping and each to include a preferred pair for one of the received access requests; and supplying to each of the subsets access-data-specifying information which accompanies the access request to which the preferred pair of the subset corresponds, the access-data-specifying information to be compared with tag information held by a pair of the subset.

2. The multi-access method according to claim 1, further comprising the step of, when a single access request is received, supplying access-data-specifying information which accompanies the single access request to each of the plurality of pairs, for performing an access in accordance with the single access request.

3. The multi-access method according to claim 1, wherein the storage level comprises a cache mechanism which operates under a set associative method, and each of the pairs is handled as a way.

4. The multi-access method according to claim 1, further comprising the step of, when it is found, as a result of performing an access in each subset in accordance with each access request, that data to be accessed by a certain access request is not held in the corresponding subset, supplying access-data-specifying information which accompanies the certain access request to a pair not belonging to the corresponding subset, for performing an access in accordance with the certain access request.

5. The multi-access method according to claim 1, further comprising the step of supplying, for each access request and before it is found, as a result of performing an access to the corresponding subset in accordance with the access request, whether data to be accessed by the access request is held in a data array of the corresponding subset, supplying access-data-specifying information which accompanies the access request to a pair not belonging to the corresponding subset, for performing an access in accordance with the access request.

6. The multi-access method according to claim 4, further comprising the steps of:

when it is found that none of the plurality of pairs holds in its corresponding data array data to be accessed by a certain access request, determining that the data for the certain access request has been mis-hit with respect to the storage level;

reading the data from a storage device based on access-data-specifying information accompanying the certain access request; and writing the read data into the storage level.

7. The multi-access method according to claim 6, wherein:

the writing step includes referring to respective times at which data stored in each of the pairs was most recently accessed; and the data read from the storage device due to a determination of a mis-hit is written into a pair which holds the oldest data.

8. The multi-access method according to claim 6, wherein a data storage priority is previously assigned to each pair of the storage level in accordance with access requester information.

9. The multi-access method according to claim 8, wherein:

for each of the pairs, reference is made to the data storage priority assigned thereto;

for each of the pairs, the data storage priority was previously assigned to the pair in accordance with access requester information of an access request which has been determined to be a mis-hit; and the data read from the storage device due to determination of the mis-hit is preferentially written into a pair having a higher data storage priority.

10. The multi-access method according to claim 9, wherein when space for writing data is not available in the pair having the higher data storage priority, the data is written into another pair having free space, regardless of the data storage priority of the other pair.

11. The multi-access method according to claim 10, wherein when none of the plurality of pairs has free space for writing data, the data read from the storage device is written into the pair having the higher data storage priority.

12. The multi-access method according to claim 11, wherein:

the writing step includes referring to respective times at which data stored in each of the pairs was most recently accessed; and when data most recently accessed is stored in the pair having the higher data storage priority, the data read from the storage device is written into a pair holding the oldest data.

13. The multi-access method according to claim 10, wherein, when none of the plurality of pairs has free space for writing data;

reference is made to respective times when data stored in each of the pairs was most recently accessed; and the data read from the storage device is written into a pair holding the oldest data.

14. The multi-access method according to claim 8, wherein;

for each of the pairs, reference is made to the data storage priority assigned thereto;

for each of the pairs, the data storage priority was previously assigned to the pair in accordance with access requester information of a received access request; and access-data-specifying information which accompanies the received access request is preferentially supplied to a subset which contains a pair having a higher data storage priority, for performing an access in accordance with the received access request.

15. The multi-access method according to claim 8, wherein a process identifier is set for each process to be performed by a processor which accesses the storage level, and the access requester information includes the process identifier.

16. The multi-access method according to claim 8, wherein a thread identifier is set for each thread to be processed by a processor which accesses the storage level, and the access requester information includes the thread identifier.

17. The multi-access method according to claim 8, wherein, when there exist a plurality of processors which access the storage level, the access requester information includes information identifying each of the processors.

18. The multi-access method according to claim 8, wherein the access requester information includes an address serving as access-data-specifying information which accompanies an access request.

19. The multi-access method according to claim 14, wherein data stored in a first pair of the storage level is moved to a second pair of the storage level.

20. The multi-access method according to claim 5, further comprising the steps of:

when it is found that none of said plurality of pairs holds in its corresponding data array data to be accessed by a certain access request, determining that data for the certain access request has been mis-hit in the storage level;

reading data from a storage device based on access-data-specifying information accompanying the certain access request; and writing the read data into the storage level.

21. The multi-access method according to claim 20, wherein:

the writing step includes referring to respective times at which data stored in each of the pairs was most recently accessed; and the data read from the storage device due to a determination of a mis-hit is written into a pair which holds the oldest data.

22. The multi-access method according to claim 20, wherein a data storage priority is previously assigned to each pair of the storage level in accordance with access requester information.

23. The multi-access method according to claim 22, wherein:

for each of the pairs, reference is made to the data storage priority assigned thereto;

for each of the pairs, the data storage priority was previously assigned to the pair in accordance with access requester information of an access request which has been determined to be a mis-hit; and the data read from the storage device due to determination of the mis-hit is preferentially written into a pair having a higher data storage priority.

24. The multi-access method according to claim 23, wherein when space for writing data is not available in the pair having the higher data storage priority, the data read from the storage device is written into another pair having free space, regardless of the data storage priority of the other pair.

25. The multi-access method according to claim 24, wherein when none of the plurality of pairs has free space for writing data, the data read from the storage device is written into the pair having the higher data storage priority.

26. The multi-access method according to claim 25, wherein:

the writing step includes referring to respective times at which data stored in each of the pairs was most recently accessed; and when data corresponding to a latest one of the times is stored in the pair having the higher data storage priority, the data read from the storage device is written into a pair holding the oldest data.

27. The multi-access method according to claim 24, wherein, when none of said plurality of pairs has free space for writing data:

reference is made to respective times when data stored in each of the pairs was most recently accessed; and the data read from the storage device is written into a pair holding the oldest data.

28. The multi-access method according to claim 22, wherein:

for each of the pairs, reference is made to the data storage priority assigned thereto;

for each of the pairs, the data storage priority was previously assigned to the pair in accordance with access requester information of a received access request and access-data-specifying information which accompanies the received access request is preferentially supplied to a subset which contains the pair having a higher data storage priority, for performing an access in accordance with the received access request.

29. The multi-access method according to claim 22, wherein a process identifier is set for each process to be performed by a processor which accesses the storage level, and the access requester information includes the process identifier.

30. The multi-access method according to claim 22, wherein a thread identifier is set for each thread to be processed by a processor which accesses the storage level, and the access requester information includes the thread identifier.

31. The multi-access method according to claim 22, wherein, when there exist a plurality of processors which access the storage level, the access requester information includes information identifying each of the processors.

32. The multi-access method according to claim 22, wherein the access requester information includes an address serving as access-data-specifying information which accompanies an access request.

33. The multi-access method according to claim 28, wherein data stored in a first pair of the storage level is moved to a second pair of the storage level.

34. The multi-access method according to claim 1, wherein:

there is provided in each of the pairs a copy of the tag array of the pair as a duplicate tag array; and when it is found, as a result of performing in accordance with each access request an access to the corresponding subset, that data to be accessed by a certain access request is not held in the corresponding subset, it is determined whether there exists a pair which holds the data to be accessed by the certain access request, based on tag information held in the duplicate tag array of a pair not belonging to the corresponding subset and the access-data-specifying information which accompanies the certain access request, whereby a pair which holds the data to be accessed by the certain access request is identified when such a pair exists.

35. A multi-access cache memory device comprising:

a cache mechanism including a plurality of pairs, each pair comprising a data array holding data to be accessed and a tag array holding tag information for specifying data held in the data array, in an information processing apparatus including a plurality of storage levels;

a plurality of input ports concurrently receiving a plurality of access requests;

a switching mechanism interposed between said plurality of input ports and said cache mechanism and selectively supplying access-data-specifying information, input via one of the input ports in conjunction with an access request, to one of the pairs of said cache mechanism; and a switching mechanism control unit controlling a state of switching of said switching mechanism to divide said plurality of pairs into plural subsets based on predetermined information indicating preferred pairs for respectively corresponding access requests, the plurality of subsets being selected to be non-overlapping and each to include a preferred pair for one of the received access requests, whereby each subset can be supplied access-data-specifying information of the corresponding access request, the access-data-specifying information to be compared with tag information held by a pair of the subset for determining whether the pair holds data to be accessed in accordance with the access request.

36. The multi-access cache memory device according to claim 35, wherein when a single access request is received from said plurality of input ports, said switching mechanism control unit controls the state of switching of said switching mechanism to supply access-data-specifying information which accompanies the single access request to each of said plurality of pairs, for performing an access in accordance with the singe access request.

37. The multi-access cache memory device according to claim 35, wherein said cache mechanism is operated under a set associative method, and each of the pairs is handled as a way.

38. The multi-access cache memory device according to claim 35, wherein when it is found, as a result of performing in accordance with each access request an access to the corresponding subset, that data to be accessed by a certain access request is not held in the subset corresponding to the certain access request, said switching mechanism control unit controls the state of switching of said switching mechanism to supply access-data-specifying information which accompanies the certain access request to a pair not belonging to the subset corresponding to the certain access request, for performing an access in accordance with the certain access request.

39. The multi-access cache memory device according to claim 35, wherein for each of the access requests, before it is found, as a result of performing in accordance with the access request an access to the corresponding subset, whether data to be accessed by the access request is held in the corresponding subset, said switching mechanism control unit controls the state of switching of said switching mechanism to supply access-data-specifying information which accompanies the access request to a pair not belonging to the corresponding subset, for performing an access in accordance with the access request.

40. The multi-access cache memory device according to claim 38, further comprising a cache mechanism control unit that, when it is found that none of said plurality of pairs holds in its corresponding data array data to be accessed by access request, determines that data for the access request has been mis-hit in said cache mechanism, and performs control to read corresponding data from a storage device based on access-data-specifying information accompanying the access request and to write the read data into said cache mechanism.

41. The multi-access cache memory device according to claim 40, wherein said cache mechanism control unit refers to respective times when data stored in each of the pairs was most recently accessed, and performs control to write the data which was read from the storage device due to determination of a mis-hit into a pair which holds the oldest data.

42. The multi-access cache memory device according to claim 40, further comprising a priority assigning unit that assigns a data storage priority to each pair of said cache mechanism in accordance with access requester information.

43. The multi-access cache memory device according to claim 42, wherein:

for each of the pairs, said cache mechanism control unit refers to the data storage priority assigned thereto;

for each of the pairs, the data storage priority was previously assigned to the pair by said priority assigning unit in accordance with access requester information of an access request determined to be a mis-hit; and said cache mechanism control unit performs control to preferentially write data which was read from the storage device due to determination of a mis-hit into a pair having a higher data storage priority.

44. The multi-access cache memory device according to claim 43, wherein when space for writing data is not available in the pair having the higher data storage priority, said cache mechanism control unit performs control to write the data read from the storage device into another pair having free space, regardless of the data storage priority of the other pair.

45. The multi-access cache memory device according to claim 44, wherein when none of said plurality of pairs has free space for writing data, said cache mechanism control unit performs control to write the data read from the storage device into the pair having the higher data storage priority.

46. The multi-access cache memory device according to claim 45, wherein said cache mechanism control unit refers to respective times when data stored in each of the pairs was most recently accessed, and when a latest of the times corresponds to data stored in the pair having the higher data storage priority, said cache mechanism control unit performs control to write data from the pair having the higher priority into a pair holding the oldest data.

47. The multi-access cache memory device according to claim 44, wherein when none of said plurality of pairs has free space for writing data, said cache mechanism control unit refers to respective times when data stored in each of the pairs was most recently accessed, and performs control to write the data read from the storage device into a pair holding the oldest data.

48. The multi-access cache memory device according to claim 42, wherein:

for each of the pairs, said switching mechanism control unit refers to the data storage priority assigned thereto;

for each of the pairs, the data storage priority was previously assigned to the pair by said priority assigning unit in accordance with access-requester information of an access request received from said plurality of input ports; and said switching mechanism control unit controls the state of switching of said switching mechanism to preferentially supply access-data-specifying information which accompanies the received access request to a subset which contains the pair having the higher data storage priority, for performing an access in accordance with the received access request.

49. The multi-access cache memory device according to claim 42, wherein a process identifier is set for each process to be performed by a processor which accesses said cache mechanism, and the access requester information includes at least one of the process identifiers.

50. The multi-access cache memory device according to claim 42, wherein a thread identifier is set for each thread to be processed by a processor which accesses said cache mechanism, and the access requester information includes at least one of the thread identifiers.

51. The multi-access cache memory device according to claim 42, wherein when there exist a plurality of processors which access the cache mechanism, the access requester information includes information identifying each of the processors.

52. The multi-access cache memory device according to claim 42, wherein the access requester information includes an address serving as access-data-specifying information which accompanies an access request.

53. The multi-access cache memory device according to claim 48, further comprising a move instructing unit that moves data stored in a first pair of said cache mechanism to a second pair of said cache mechanism.

54. The multi-access cache memory device according to claim 39, further comprising a cache mechanism control unit that, when it is found that none of said plurality of pairs holds in its corresponding data array data to be accessed by an access request, determines that data for the access request has been mis-hit in said cache mechanism, and performs control to read corresponding data from a storage device based on access-data-specifying information accompanying the access request and to write the read data into said cache mechanism.

55. The multi-access cache memory device according to claim 54, wherein said cache mechanism control unit refers to respective times when data stored in each of the pairs was most recently accessed, and performs control to write the data which was read from the storage device due to determination of a mis-hit into a pair which holds oldest data.

56. The multi-access cache memory device according to claim 54, further comprising a priority assigning unit that assigns a data storage priority to each pair of said cache mechanism in accordance with access requester information.

57. The multi-access cache memory device according to claim 56, wherein:

for each of the pairs, said cache mechanism control unit refers to the data storage priority assigned thereto;

for each of the pairs, the data storage priority was previously assigned to the pair by said priority assigning unit in accordance with access requester information of an access request determined to be a mis-hit, and said cache mechanism control unit performs control to preferentially write data which was read from the storage device due to determination of a mis-hit into a pair having a higher data storage priority.

58. The multi-access cache memory device according to claim 57, wherein when space for writing data is not available in the pair having the higher data storage priority, said cache mechanism control unit performs control to write the data read from the storage device into another pair having free space, regardless of the data storage priority of the other pair.

59. The multi-access cache memory device according to claim 58, wherein when none of said plurality of pairs has free space for writing data, said cache mechanism control unit performs control to write the data read from the storage device into the pair having the higher data storage priority.

60. The multi-access cache memory device according to claim 59, wherein said cache mechanism control unit refers to respective times when data stored in each of the pairs was most recently accessed, and when a latest of the times corresponds to data stored in the pair having the higher data storage priority, said cache mechanism control unit performs control to write data from the pair having the higher data storage priority into a pair holding the oldest data.

61. The multi-access cache memory device according to claim 58, wherein when none of said plurality of pairs has free space for writing data, said cache mechanism control unit refers to respective times when data stored in each of the pairs was most recently accessed, and performs control to write the data read from the storage device into a pair holding the oldest data.

62. The multi-access cache memory device according to claim 56, wherein:

for each of the pairs, said switching mechanism control unit refers to the data storage priority assigned thereto;

for each of the pairs, the data storage priority was previously assigned to the pair by said priority assigning unit in accordance with access requester information of an access request received from said plurality of input ports; and said switching mechanism control unit controls the state of switching of said switching mechanism to preferentially supply access-data-specifying information which accompanies the received access request to a subset which contains the pair having the higher data storage priority, for performing an access in accordance with the received access request.

63. The multi-access cache memory device according to claim 56, wherein a process identifier is set for each process to be processed by a processor which accesses said cache mechanism, and the access requester information includes at least one of the process identifiers.

64. The multi-access cache memory device according to claim 56, wherein a thread identifier is set for each thread to be processed by a processor which accesses said cache mechanism, and the access requester information includes at least one of the thread identifiers.

65. The multi-access cache memory device according to claim 56, wherein when there exist a plurality of processors which access said cache mechanism, the access requester information includes information identifying each of the processors.

66. The multi-access cache memory device according to claim 56, wherein the access requester information includes an address serving as access-data-specifying information which accompanies an access request.

67. The multi-access cache memory device according to claim 62, further comprising a move instructing unit that moves data stored in a first pair of said cache mechanism to a second pair of said cache mechanism.

68. The multi-access cache memory device according to claim 35, further comprising a snoop mechanism having, for each of the pairs, a copy of the tag array of the pair as a duplicate tag array;

wherein when it is found, as a result of performing an access to each of the subsets in accordance with the access request to which the subset corresponds, that data to be accessed by a certain access request is not held in the corresponding subset, said snoop mechanism supplies access-data-specifying information accompanying the certain access request to a pair not belonging to the corresponding subset, and determines whether there exists a pair which holds the data to be accessed by the certain access request, based on tag information held in the duplicate tag array for the pair and the access-data-specifying information, whereby a pair which holds the data to be accessed by the certain access request is identified when such a pair exists.

69. A computer-readable medium encoded with a program for multi-access of a storage level including a plurality of pairs each comprising a data array and a tag array, said program comprising the functions of:

when a plurality of access requests are received, dividing the plurality of pairs into a plurality of subsets based on predetermined information indicating preferred pairs for respectively corresponding access requests, the plurality of subsets being selected to be non-overlapping and each to include a preferred pair for one of the received access requests; and supplying to each of the subsets access-data-specifying information which accompanies the access request to which the preferred pair of the subset corresponds, the access-data-specifying information to be compared with tag information held by a pair of the subset.

* * * * *